US012551300B2

(12) United States Patent
Ida et al.

(10) Patent No.: US 12,551,300 B2
(45) Date of Patent: Feb. 17, 2026

(54) SURGICAL SYSTEM DISPLAYING GRAPHICAL USER INTERFACE ON ENDOSCOPE IMAGE

(71) Applicant: MEDICAROID CORPORATION, Kobe (JP)

(72) Inventors: Jota Ida, Kobe (JP); Tetsushi Ito, Kobe (JP); Tsuyoshi Takahashi, Kobe (JP); Kazuya Sasamori, Kobe (JP)

(73) Assignee: MEDICAROID CORPORATION, Kobe (JP)

( * ) Notice: Subject to any disclaimer, the term of this patent is extended or adjusted under 35 U.S.C. 154(b) by 345 days.

(21) Appl. No.: 18/322,097

(22) Filed: May 23, 2023

(65) Prior Publication Data

US 2023/0380913 A1 Nov. 30, 2023

(30) Foreign Application Priority Data

May 24, 2022 (JP) ................................ 2022-084482
May 24, 2022 (JP) ................................ 2022-084483

(51) Int. Cl.
*A61B 34/00* (2016.01)
*A61B 1/00* (2006.01)
(Continued)

(52) U.S. Cl.
CPC ............ *A61B 34/25* (2016.02); *A61B 1/0004* (2022.02); *A61B 1/0005* (2013.01); *A61B 1/00149* (2013.01); *A61B 1/045* (2013.01); *A61B 34/37* (2016.02); *A61B 2034/301* (2016.02); *A61B 2034/742* (2016.02)

(58) Field of Classification Search
None
See application file for complete search history.

(56) References Cited

U.S. PATENT DOCUMENTS 8,418,073 B2 4/2013 Mohr et al.
8,862,268 B2 10/2014 Robinson et al.
(Continued)

FOREIGN PATENT DOCUMENTS

JP 2001-104333 A 4/2001
JP 2013-188574 A 9/2013
JP 2021-19949 A 2/2021

*Primary Examiner* — John P Leubecker
(74) *Attorney, Agent, or Firm* — METROLEX IP LAW GROUP, PLLC; Robert L. Scott, Esq.

(57) ABSTRACT

A surgical system according to an embodiment may include: manipulators supporting an endoscope and surgical instruments, respectively; a remote control apparatus including: a first display device including a first display to display an endoscope image captured by the endoscope; and two operation handles to operate two of the surgical instruments; a controller configured to display, on the first display, a graphical user interface superimposed on the endoscope image; and an input device provided to at least one of the manipulators to receive a predetermined input from a user, wherein the controller is configured to display, in response to the predetermined input through the input device when a distal end of at least one of the surgical instruments is located outside a field of view of the endoscope, a mark indicating the surgical instrument outside the field of view of the endoscope in the graphical user interface.

20 Claims, 17 Drawing Sheets

(51) Int. Cl.
  *A61B 1/045* (2006.01)
  *A61B 34/30* (2016.01)
  *A61B 34/37* (2016.01)

(56) References Cited

U.S. PATENT DOCUMENTS

| | | | |
|---|---|---|---|
| 9,301,811 B2 | 4/2016 | Goldberg et al. | |
| 9,718,190 B2 | 8/2017 | Larkin et al. | |
| 10,092,344 B2 | 10/2018 | Mohr et al. | |
| 10,610,315 B2 | 4/2020 | Itkowitz et al. | |
| 10,730,187 B2 | 8/2020 | Larkin et al. | |
| 10,773,388 B2 | 9/2020 | Larkin et al. | |
| 10,806,533 B2 | 10/2020 | Mustufa et al. | |
| 2009/0088773 A1* | 4/2009 | Zhao | A61B 34/37 606/130 |
| 2009/0192523 A1* | 7/2009 | Larkin | A61B 34/20 606/130 |
| 2013/0217967 A1* | 8/2013 | Mohr | A61B 34/37 600/109 |
| 2016/0192998 A1* | 7/2016 | Goldberg | A61B 34/35 606/130 |
| 2016/0338786 A1* | 11/2016 | Robinson | A61B 34/76 |
| 2017/0165013 A1 | 6/2017 | Itkowitz et al. | |
| 2017/0210012 A1 | 7/2017 | Larkin et al. | |
| 2017/0305016 A1* | 10/2017 | Larkin | A61B 1/0051 |
| 2018/0092700 A1* | 4/2018 | Itkowitz | A61B 90/94 |
| 2018/0228343 A1 | 8/2018 | Seeber | |
| 2018/0296280 A1 | 10/2018 | Kurihara et al. | |
| 2018/0297206 A1 | 10/2018 | Larkin et al. | |
| 2019/0038335 A1 | 2/2019 | Mohr et al. | |
| 2019/0231459 A1* | 8/2019 | Mustufa | A61B 90/00 |
| 2020/0038125 A1 | 2/2020 | Farlow | |
| 2020/0138534 A1* | 5/2020 | Garcia Kilroy | A61G 13/08 |
| 2020/0163731 A1* | 5/2020 | Itkowitz | A61B 34/25 |
| 2020/0170718 A1* | 6/2020 | Peine | A61B 90/37 |
| 2020/0331147 A1 | 10/2020 | Larkin et al. | |
| 2021/0030257 A1* | 2/2021 | Ishihara | A61B 1/00149 |
| 2024/0099790 A1* | 3/2024 | Johnson | G06F 3/04845 |
| 2024/0217115 A1* | 7/2024 | Mizohata | B25J 13/06 |
| 2024/0341867 A1* | 10/2024 | Stachulski | A61B 34/20 |

* cited by examiner

FIG. 28
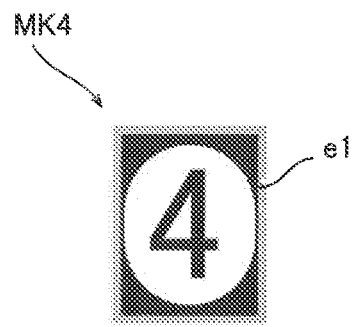
FIG. 29A            FIG. 29B
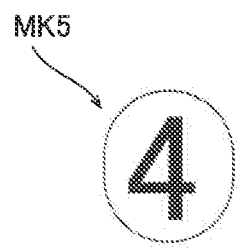    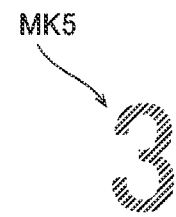

SURGICAL SYSTEM DISPLAYING GRAPHICAL USER INTERFACE ON ENDOSCOPE IMAGE

CROSS REFERENCE TO RELATED APPLICATIONS

This application claims priority based on 35 USC 119 from prior Japanese Patent Applications No. 2022-084482 filed on May 24, 2022 and No. 2022-084483 filed on May 24, 2022, the entire contents of each of which are incorporated herein by reference.

BACKGROUND

The disclosure may relate to a robotic surgical system, a display method, and a program thereof, and more particularly to a robotic surgical system, a display method, and a program to display, in a display device, a graphical user interface on an image captured by an endoscope in an overlapped manner.

In a related art, there is known a robotic surgical system that superimposes and displays a graphical user interface on an image captured by an endoscope (see, for example, Patent Document 1: Japanese Patent Application Publication No. 2013-188574).

In the robotic surgical system disclosed in Patent Document 1, the endoscope captures an image of a surgical site, in order to display the captured image in a viewing area (image display area) of a monitor screen. In the robotic surgical system, a current position of a surgical tool is determined relative to the image (the field of view) captured by the endoscope. Then, when the determined current position of the surgical tool is located outside the image (the field of view), a symbol indicating the current position of the surgical tool is displayed at a boundary area outside the viewing area of the monitor screen.

Patent Document 1: Japanese Patent Application Publication No. 2013-188574.

SUMMARY

However, in such a robotic surgical system disclosed in Patent Document 1, the operator may concentrate on the center region of the viewing area of the monitor screen during surgery. Accordingly, even if the current position of the tool (the surgical instrument) that is located outside the field of view is displayed as the symbol (mark) in the boundary area outside the viewing area of the monitor screen, the operator may not notice the symbol. In order for the operator to notice the symbol, the operator may need to significantly move the line of sight.

An object of one or more embodiments of the disclosure may be to provide a surgical system and a display method that allows an operator to easily visually recognize a mark indicating a surgical instrument that is located outside the field of view without significantly moving the line of sight.

A first aspect of the disclosure may be a surgical system that may include: manipulators that support an endoscope and surgical instruments, respectively; a remote control apparatus that includes: a first display device configured to display an endoscope image captured by the endoscope; and two operation handles configured to operate two of the surgical instruments; a controller configured to display, on a display of the first display device, a graphical user interface superimposed on the endoscope image captured by the endoscope; and an input device configured to receive a predetermined input from a user, wherein the controller is configured to display, in response to the predetermined input through the input device when a distal end of at least one of the surgical instruments is located outside a field of view of the endoscope, a mark that indicates the surgical instrument that is located outside the field of view of the endoscope in a mark display area of the graphical user interface.

According to the first aspect of the disclosure, the controller displays, in response to the predetermined input from the input device when at least one of the surgical instruments is located outside the field of view of the endoscope, the mark indicating the surgical instrument that is located outside the field of view of the endoscope, in the mark display area of the graphical user interface. Accordingly, the mark indicating the surgical instrument that is located outside the field of view of the endoscope is displayed in the display. As a result, the operator can easily visually recognize the mark indicating the surgical instrument that is located outside the field of view without significantly moving the line of sight. In addition, since the mark indicating the surgical instrument that is positioned outside the field of view is displayed in response to the predetermined input through the input device, the mark is not displayed when the predetermined input is not made through the input device. As a result, it is possible to suppress displaying the mark at a position that is easy for the operator to see even when it is unnecessary.

A second aspect of the disclosure may be a display method executed by a controller in a surgical system that may include: acquiring an endoscope image captured by an endoscope; determining whether or not any one of surgical instruments is located outside a field of view of the endoscope; determining whether or not a predetermined input is made through an input device; and in response to the predetermined input through the input device when any one of the surgical instruments is located outside of the field of view of the endoscope, displaying, on a display, a graphical user interface superimposed on the endoscope image captured by the endoscope, wherein the displayed graphical user interface includes a mark that indicates the surgical instrument that is located outside the field of view of the endoscope.

According to the second aspect of the disclosure, the graphical user interface is displayed on the display such that the graphical user interface is superimposed on the endoscope image captured by the endoscope, wherein in response to the predetermined input through the input device when at least one of the surgical instruments is located outside the field of view of the endoscope, the graphical user interface displays the mark that indicates the surgical instrument located outside of the field of view of the endoscope. Accordingly, the mark indicating the surgical instrument that is located outside the field of view of the endoscope is displayed in the display. As a result, it is possible to provide a display method capable of allowing a user to easily visually recognize the mark indicating the surgical instrument outside the field of view of the endoscope without significantly moving a line of sight. In addition, since the mark indicating the surgical instrument outside the field of view is displayed in response to the predetermined input through the input device, the mark is not displayed when the predetermined input is not made through the input device. As a result, it is possible to provide a display method capable of suppressing display of the mark even when it is unnecessary.

A third aspect of the disclosure may be a non-transitory computer-readable storage medium storing a program for causing a computer to execute operations comprising:

acquiring an endoscope image captured by an endoscope; determining whether or not any one of surgical instruments is located outside a field of view of the endoscope; determining whether or not a predetermined input is made through an input device; and in response to the predetermined input through the input device when any one of the surgical instruments is located outside of the field of view of the endoscope, displaying, on a display, a graphical user interface superimposed on the endoscope image captured by the endoscope, wherein the displayed graphical user interface includes a mark that indicates the surgical instrument that is located outside the field of view of the endoscope.

According to the third aspect of the disclosure, the graphical user interface is displayed on the display such that the graphical user interface is superimposed on the endoscope image captured by the endoscope, wherein in response to the predetermined input through the input device when at least one of the surgical instruments is located outside the field of view of the endoscope, the graphical user interface displays the mark that indicates the surgical instrument located outside of the field of view of the endoscope. Accordingly, the mark indicating the surgical instrument that is located outside the field of view of the endoscope is displayed in the display. As a result, it is possible to provide a program capable of allowing a user to easily visually recognize the mark indicating the surgical instrument outside the field of view of the endoscope without significantly moving a line of sight. In addition, since the mark indicating the surgical instrument outside the field of view is displayed in response to the predetermined input through the input device, the mark is not displayed when the predetermined input is not made through the input device. As a result, it is possible to provide a program capable of suppressing display of the mark even when it is unnecessary.

According to the disclosure, the operator can easily visually recognize the mark indicating the surgical instrument that is located outside the field of view, without moving the line of sight significantly.

BRIEF DESCRIPTION OF DRAWINGS

FIG. 28 is a diagram for explaining an example of a mark according to a first modification; and FIGS. 29A and 29B are diagrams for explaining examples of marks according to a second modification.

DETAILED DESCRIPTION

Figure 1:
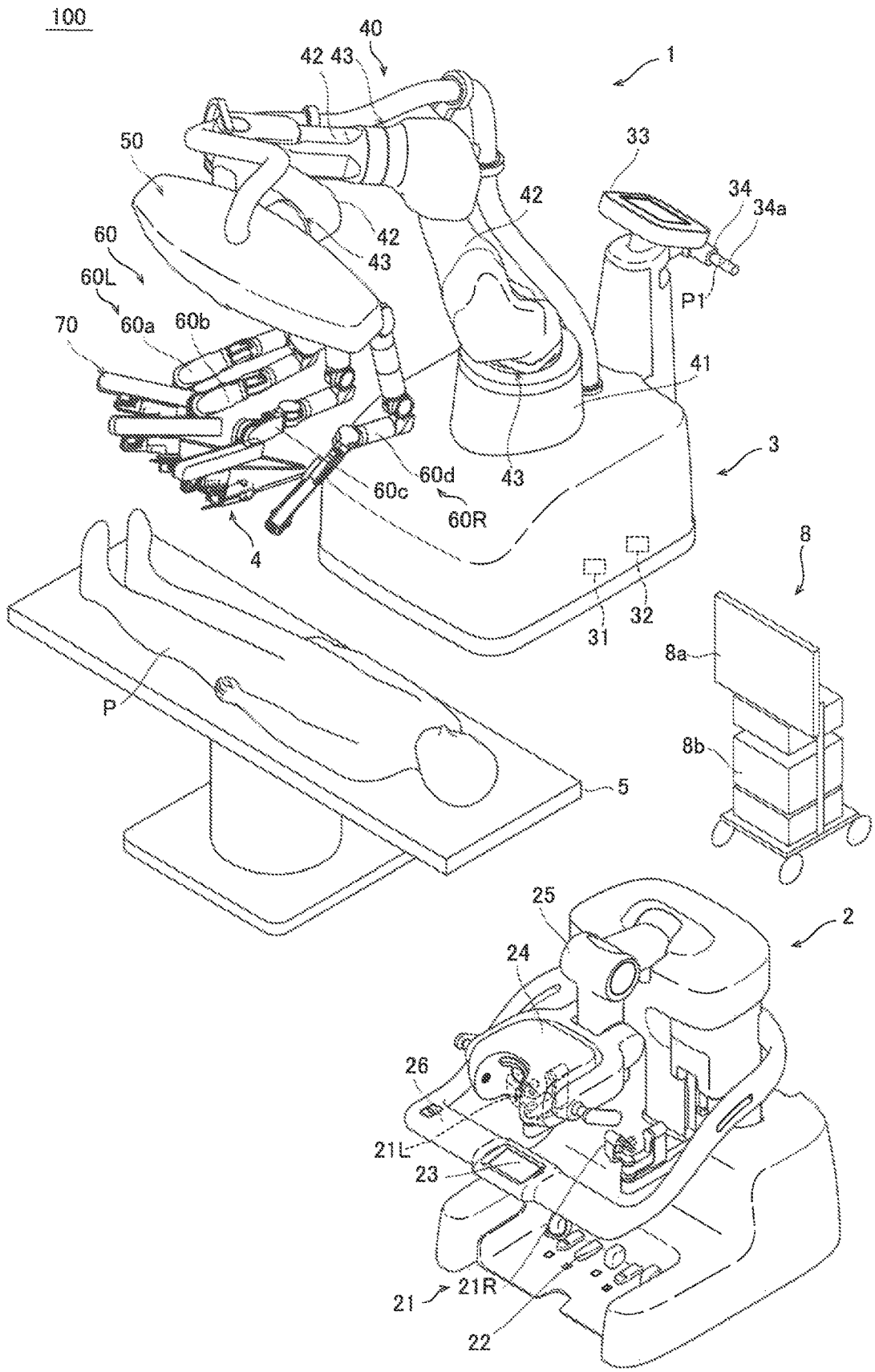
FIG. 1 is a diagram illustrating a view of a configuration of a surgical operation system according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

A configuration of a surgical operation system 100 according to a first embodiment is described with reference to FIGS. 1 to 24. The surgical operation system 100 includes a medical manipulator 1 serving as a patient-side apparatus and a remote control apparatus 2 serving as an operator-side apparatus to operate the medical manipulator 1. The medical manipulator 1 is provided with a medical trolley 3 and is thus configured to be movable. The remote control apparatus 2 is provided at a location away from the medical manipulator 1. The medical manipulator 1 is configured to be remotely operated by the remote control apparatus 2. An operator (such as a doctor) inputs to the remote control apparatus 2 a command (an instruction) that causes the medical manipulator 1 to perform a desired operation. The remote control apparatus 2 transmits the input command to the medical manipulator 1. The medical manipulator 1 operates in response to the command received. The medical manipulator 1 is disposed in a surgery room, as a sterile field, which is sterilized. The surgical operation system 100 is an example of a "surgical system."

The remote control apparatus 2 is disposed inside the surgery room or outside the surgery room, for example. The remote control apparatus 2 includes operation handles 21, foot pedals 22, a touch panel 23, a monitor 24, a support arm 25, and a support bar 26. The operation handles 21 are hand controllers (HC) provided for the operator (such as a doctor) to input commands. Note that the monitor 24 is an example of a "first display device."

The operation handles 21 are configured to operate the medical instruments 4. Specifically, the operation handles 21 receive an amount of movement inputted by the operator O to operate the medical instruments 4. The operation handles 21 include an operation handle 21L, which is arranged on the left side of the operator (such as a doctor) and is to be operated by the left hand of the operator O, and an operation handle 21R, which is arranged on the right side of the operator and is to be operated by the right hand of the operator O.

Figure 3:
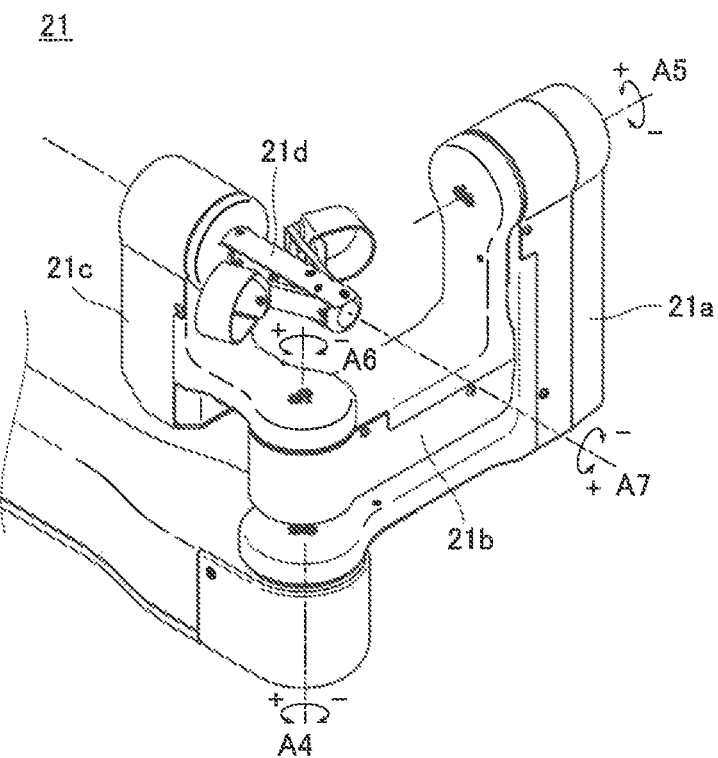
FIG. 3 is a diagram illustrating a view of a configuration of an operation handle according to a first embodiment.

As illustrated in FIG. 3, each of the operation handles 21 includes a link portion 21a, a link portion 21b, a link portion 21c, and a link portion 21d that is to be operated by the operator (such as a doctor). The link portion 21a is rotatable about an axis (joint) A4. By rotating the link portion 21a around the axis A4, an arm portion 61 described later rotates about an axis (joint) JT4. The link portion 21b is rotatable about an axis (joint) A5 with respect to the link portion 21a. By rotating the link portion 21b around the axis A5, the arm portion 61 described later rotates about an axis (joint) JT5. The link portion 21c is rotatable about an axis (joint) A6 with respect to the link portion 21b. By rotating the link portion 21c around the axis A6, the arm portion 61 rotates about an axis (joint) JT6. The link portion 21d is rotatable about an axis (joint) A7 with respect to the link portion 21c. By rotating the link portion 21d around the axis A7, the arm portion 61 rotates about an axis (joint) JT7. Note that the medical instrument 4 is an example of a surgical instrument.

Further, a movement amount of the arm 60 (medical instrument 4) is scaled (changed) with respect to the operation amount received by the operation handle 21. For example, when the movement scaling ratio is set to ½, the medical instrument 4 moves ½ of the movement distance of the operation handle 21. This allows for precise fine surgery. The arm 60 is an example of a "manipulator."

Figure 4:
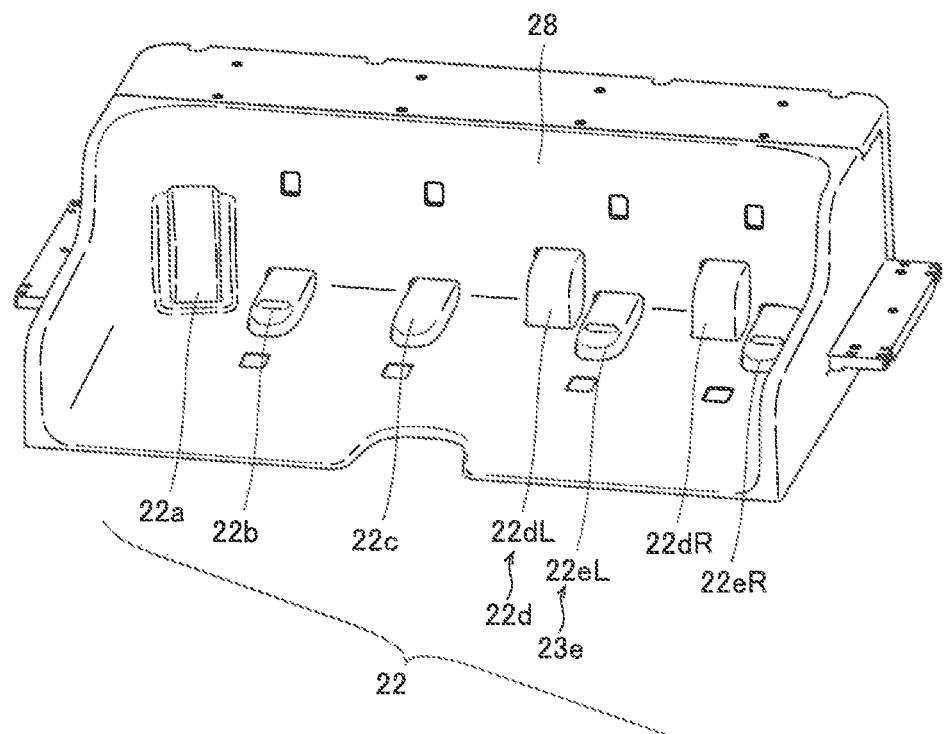
FIG. 4 is a diagram illustrating a view of foot pedals according to a first embodiment.

As illustrated in FIG. 4, the plural foot pedals 22 are provided to execute functions of the medical instrument 4. The plural foot pedals 22 are arranged on a base 28. The foot pedals 22 include a switch pedal 22a, a clutch pedal 22b, a camera pedal 22c, cutting pedals 22d, and coagulation pedals 22e. The switch pedal 22a, the clutch pedal 22b, the camera pedal 22c, the cutting pedals 22d, and the coagulation pedals 22e are operated by the foot of the operator. The cutting pedals 22d include a cutting pedal 22dR for the right arm 60 and a cutting pedal 22dL for the left arm 60. The coagulation pedals 22e include a coagulation pedal 22eR for the right arm 60 and a coagulation pedal 22eL for the left arm 60. The camera pedal 22c is an example of an "input device."

The switch pedal 22a is configured to select one of the arms 60 that is to be operated by the operation handles 21. In a first embodiment, the clutch pedal 22b is configured to perform a clutch operation that temporarily disconnects an operational connection (a control-related connection) between the arm 60 and the operation handle 21. While the clutch pedal 22b is depressed by the operator, the operation by the operation handle 21 is not transmitted to the arm 60.

The camera pedal 22c is operated for allowing the two operation handles 21 to move the endoscope 6. Specifically, the camera pedal 22c is provided for inputting a command that enables the endoscope 6 to be moved. Specifically, in response to the camera pedal 22c being depressed (stepped) by the operator, the command that enables the endoscope 6 to be moved is inputted. That is, while the command that enables the endoscope 6 to move is being inputted by the camera pedal 22c (that is, while the camera pedal 22c is depressed by the operator), the endoscope 6 is able to be moved by moving both of the operation handle 21R and operation handle 21L.

While the cutting pedal 22d (coagulation pedal 22e) is depressed (stepped) by the operator, an electrosurgical device (not illustrated) is activated.

As illustrated in FIG. 1, the monitor 24 is a display device of a scope type configured to display an image (see FIG. 13) captured by the endoscope 6. The support arm 25 supports the monitor 24 in such a manner that the height of the monitor 24 is adjusted to the height of the face of the operator (such as a doctor). The touch panel 23 is disposed on the support bar 26. When a sensor(s) provided in the vicinity of the monitor 24 detects the head of the operator, the medical manipulator 1 is allowed to be operated by the remote control apparatus 2. The operator operates the operation handles 21 and the foot pedals 22, while viewing the surgical site (or affected area) displayed on the monitor 24. With this, the command (instruction) is inputted to the remote control apparatus 2. The command that is inputted to the remote control apparatus 2 is transmitted to the medical manipulator 1.

The medical trolley 3 is provided with a control unit 31 (circuitry and/or processor) that controls the operation of the medical manipulator 1 and a storage 32 that stores therein programs for controlling the operation of the medical manipulator 1. Based on the command inputted to the remote control apparatus 2, the control unit 31 of the medical trolley 3 controls the operation of the medical manipulator 1.

Further, the medical trolley 3 is provided with an input device 33. The input device 33 is configured to accept operations to move or change posture of a positioner 40, an arm base 50, and arms 60, mainly to prepare for surgery before the surgery.

Figure 2:
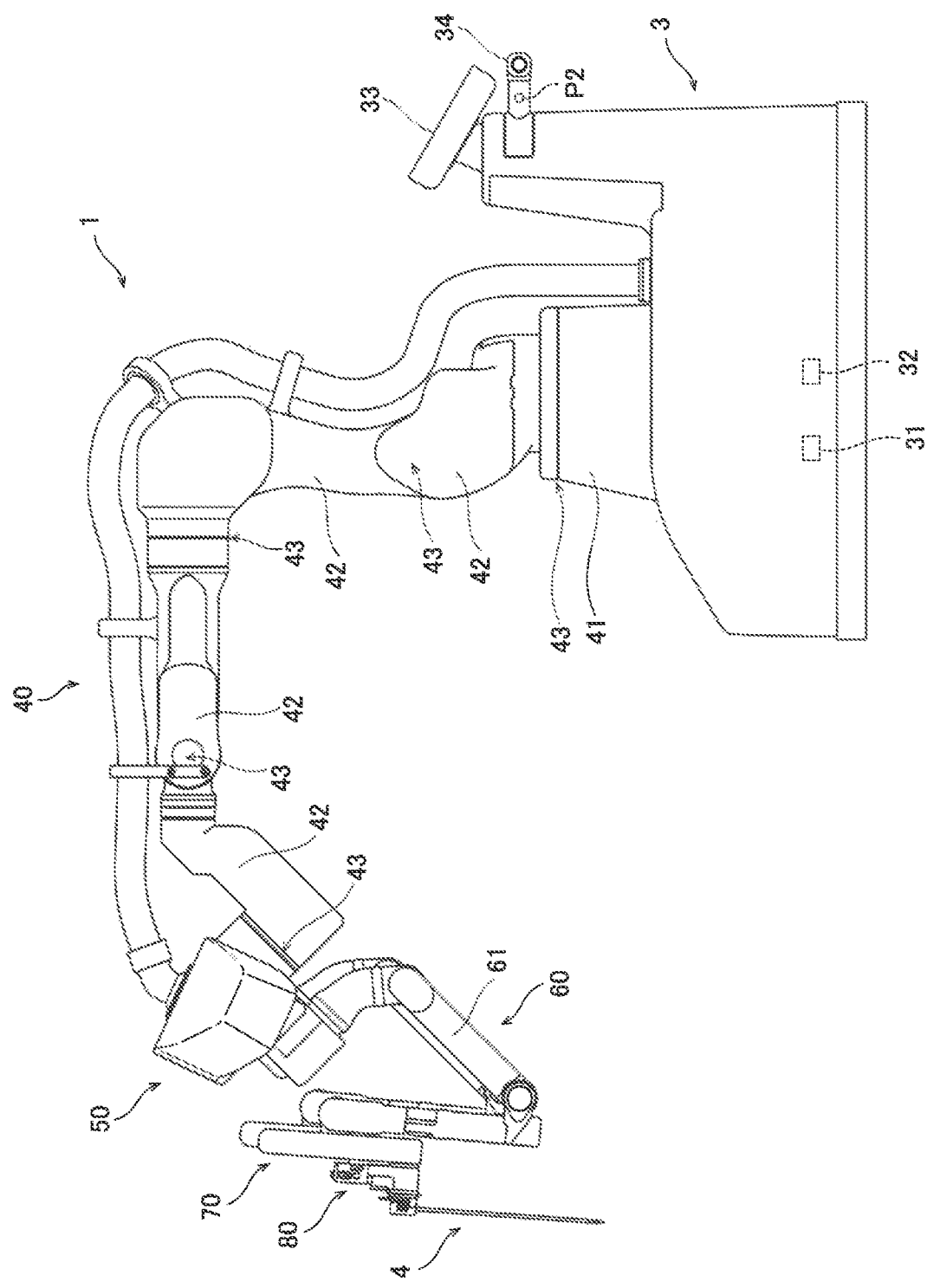
FIG. 2 is a diagram illustrating a view of a configuration of a medical manipulator according to a first embodiment.

As illustrated in FIGS. 1 and 2, the medical manipulator 1 is disposed in the surgery room. The medical manipulator 1 includes the medical trolley 3, the positioner 40, the arm base 50, and the arms 60. The arm base 50 is attached to a distal end of the positioner 40. The arm base 50 is a relatively long rod shape (elongate shape). Base portions (proximal end portions) of the arms 60 are attached to the arm base 50. Each of the arms 60 is configured such that the arm 60 is able to take a folded posture (storage posture). The arm base 50 and the arms 60 are used with being covered with a sterile drape (not illustrated). The arm 60 supports the medical instrument 4.

The positioner 40 is configured as a 7-axis articulated robot. The positioner 40 is disposed on the medical trolley 3. The positioner 40 is configured to move the arm base 50. Specifically, the positioner 40 is configured to move the position of the arm base 50 three-dimensionally.

The positioner 40 includes a base portion 41 and link portions 42 connected to the base portion 41. The link portions 42 are connected to each other via joints 43.

As illustrated in FIG. 1, to the distal end of each of the arms 60, the medical instrument 4 is attached. The medical instruments 4 include, for example, an instrument that is replaceable, an endoscope 6 (see FIG. 8) configured to capture an image of a surgical site, and the like.

The surgical operation system 100 is provided with a monitor cart 8 as illustrated in FIG. 1. The monitor cart 8 is provided with a display 8*a*. The display 8*a* is provided separately from the monitor 24 of the remote control apparatus 2. The monitor cart 8 is also provided with an image processing device 8*b*. The display 8*a* of the monitor cart 8 displays the image same as the image displayed in the monitor 24 of the remote control apparatus 2. That is, the image that is displayed on the monitor 24 and viewed by the surgeon can viewed by the worker (nurse, assistant, etc.) around the medical manipulator 1 and the patient P by means of the display 8*a* of the monitor cart 8. Note that the display 8*s* is an example of a "second display device." Note that the image processing device 8*b* is an example of an "control device" or a "controller."

Figure 5:
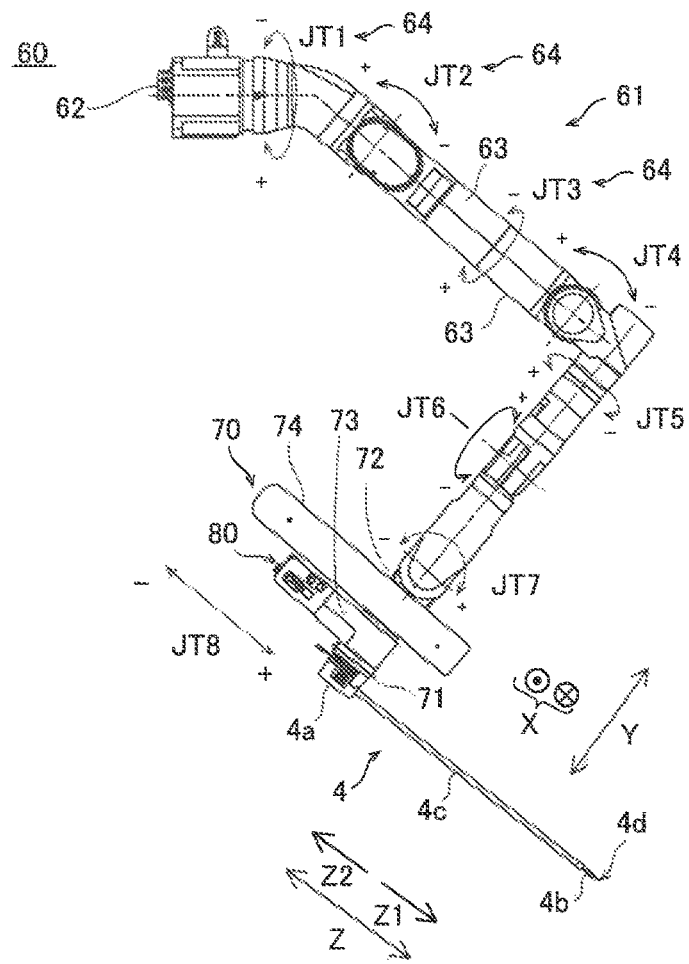
FIG. 5 is a diagram illustrating a view of a configuration of an arm of the medical manipulator according to a first embodiment.

As illustrated in FIG. 5, the instrument is provided with a driven unit 4*a*, which is driven by servomotors M2 provided in a holder 71 of the arm 60. To the distal end of the instrument, forceps 4*b* as an end effector is provided.

Figure 6:
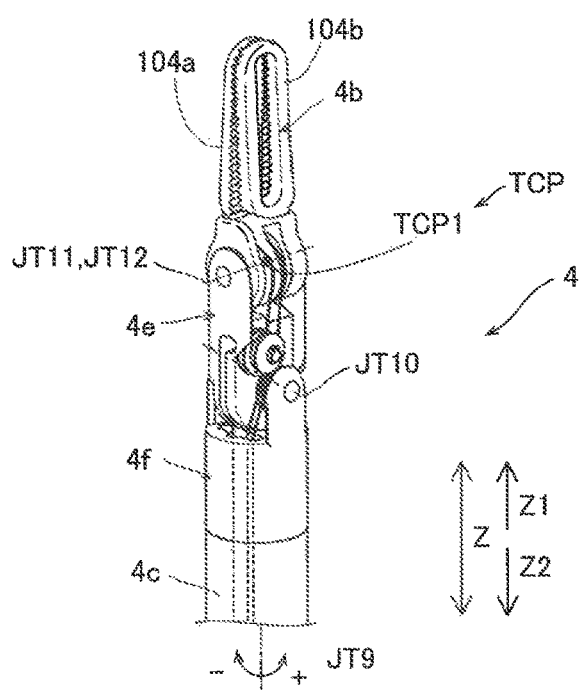
FIG. 6 is a diagram illustrating a view of forceps.

As illustrated in FIG. 6, the instrument includes: a first support 4*e* having a distal end portion thereof that rotatably supports proximal end portions of end effector members 104*a* and 104*b* about an axis (joint) JT11; a second support 4*f* having a distal end portion thereof that rotatably supports a proximal end portion of the first support 4*e* about an axis (joint) JT10; and a shaft 4*c* connected a proximal end portion of the second support 4*f*. The driven unit 4*a*, the shaft 4*c*, the second support 4*f*, the first support 4*e*, and the forceps 4*b* are arranged along the Z direction. The axis JT11 is orthogonal to a direction (Z direction) in which the shaft 4*c* extends. The axis JT10 is provided away from the axis JT11 in the direction in which the shaft 4*c* extends, and is orthogonal to the axis JT11 and orthogonal to the direction in which the shaft 4*c* extends.

The forceps 4*b* is attached to the first support 4*e* so as to be rotatable about the axis JT11. The second support 4*f* rotatably supports the first support 4*e* about the axis JT10. In other words, the first support 4*e* is attached to the second support 4*f* so as to be rotatable about the axis JT10. A distal side (Z1 side) portion of the first support 4*e* has a U-shape. A tool center point (TCP1, Clevis) is set at the center of the U-shaped distal side portion of the first support 4*e* along the axis JT11.

The medical instrument 4 (forceps 4*b*) includes an axis (joint) JT9 as a rotation axis of the shaft 4*c* (an axis (joint) extending along the direction in which the shaft 4*c* extends) and an axis (joint) JT12 about which the forceps 4*b* open and close. Note that the number of the servomotors M2 provided in the holder 71 of the arm 60 is two or more (for example, four) and rotors (rotation members) in the driven unit 4*a* are driven by the plurality of servomotors M2. As a result, the medical instrument 4 is driven about the J9, J10, J11, and J12 axes.

Figure 8:
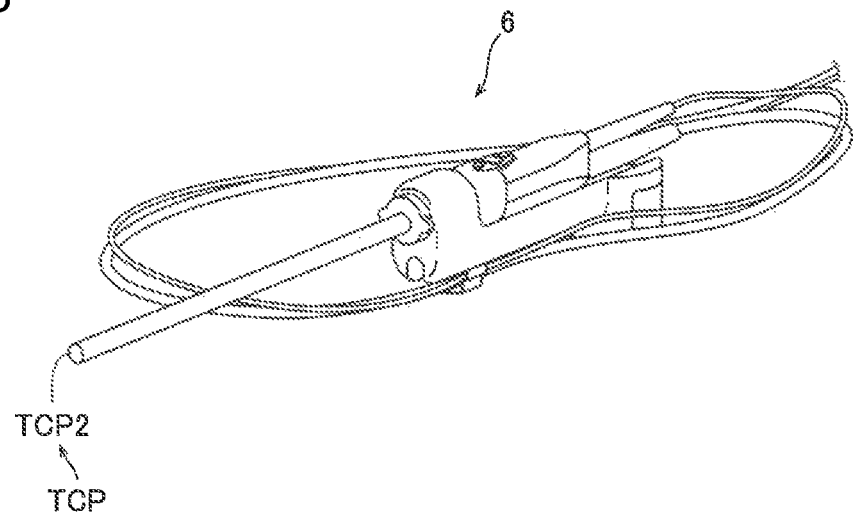
FIG. 8 is a diagram illustrating a view of an endoscope.
Figure 9:
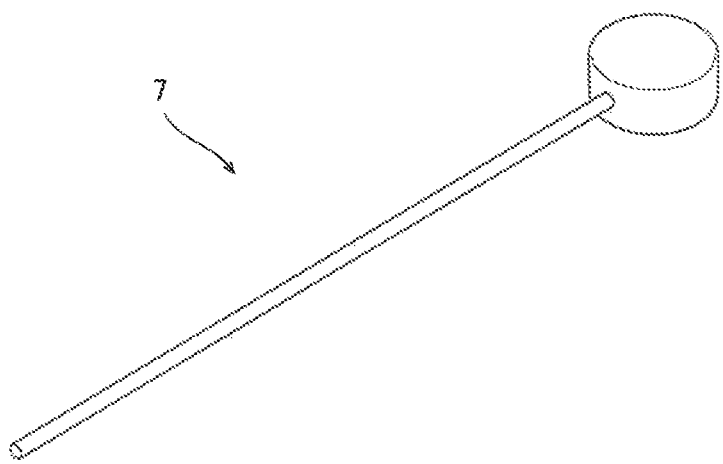
FIG. 9 is a diagram illustrating a view of a pivot position setting device.

As illustrated in FIG. 8, a tool center point TCP2 of the endoscope 6 is set at the distal end of the endoscope 6.

Next, a configuration of the arm 60 is described in detail.

As illustrated in FIG. 5, the arm 60 includes an arm portion 61 (the base portion 62, the link portions 63, the joint portions 64) and a translational movement mechanism 70 provided at the distal end portion of the arm portion 61. The arm 60 is configured such that the distal end portion thereof is three-dimensionally movable with respect to the proximal side (the arm base 50) of the arm 60. The arm portion 61 is configured as a 7-axis articulated robot arm. The plural arms 60 have the same configuration.

Figure 12:
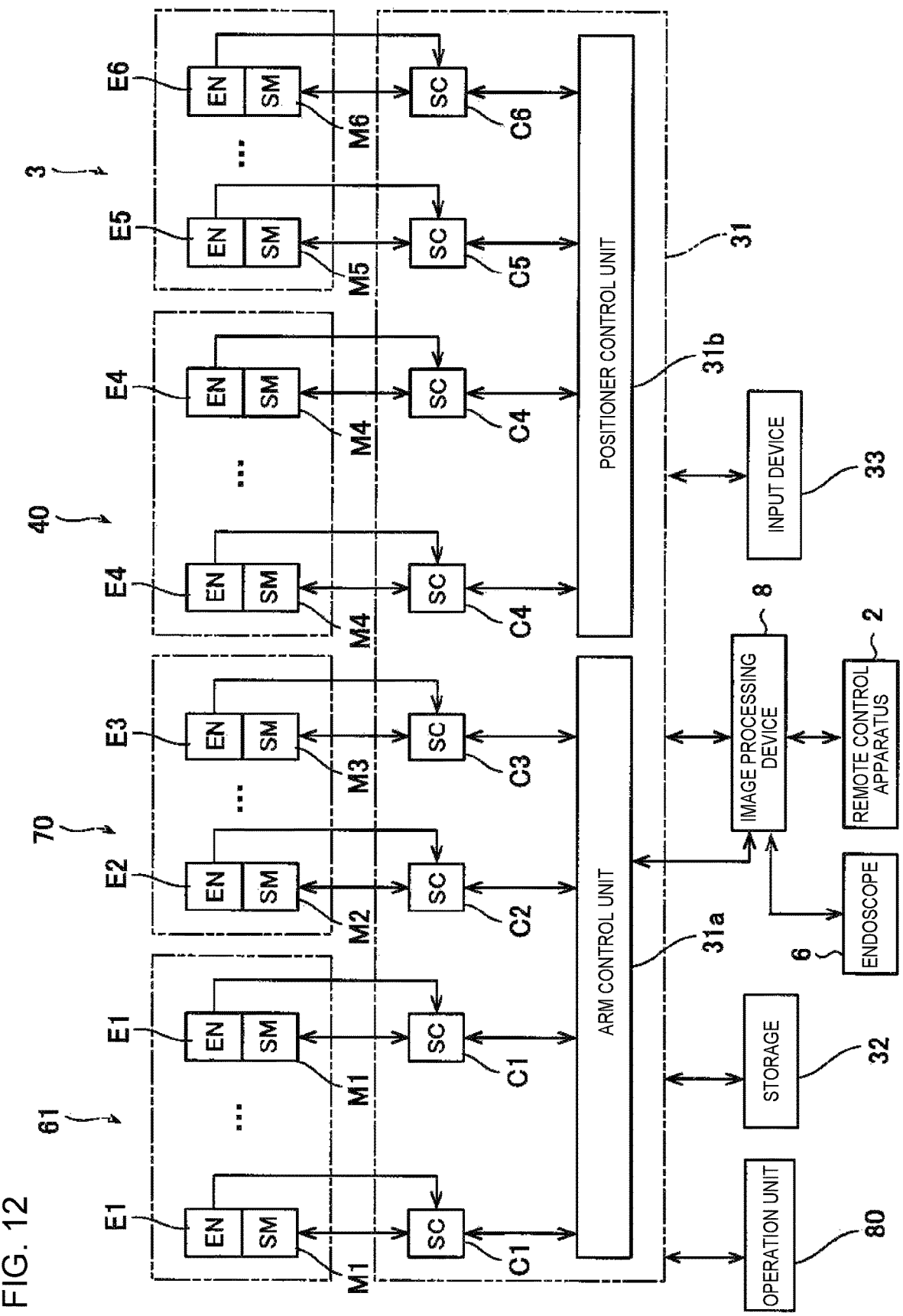
FIG. 12 is a block diagram of a configuration of a control unit of the medical manipulator according to a first embodiment.

As illustrated in FIG. 5, the arm 60 includes the axis (joints) JT1 to JT7 as rotation axes and an axis (joint) J8 as a linear motion axis. The joints JT1 to JT7 correspond to the rotation axes of the joint portions 64 of the arm portion 61. The joints JT7 corresponds to the proximal end side link portion 72 of the translational movement mechanism 70. A joint JT8 is an axis for moving the distal end side link portion 73 of the translational movement mechanism 70 relative to the proximal end side link portion 72 along the Z direction. That is, the servomotors M1 illustrated in FIG. 12 are provided to correspond to the joints JT1 to JT7 of the arm 60. The servomotor M3 is provided to correspond to the joint JT8.

The translational movement mechanism 70 is provided on a side of the distal end of the arm portion 61. The medical instrument 4 is attached to the translational movement mechanism 70. The translational movement mechanism 70 translationally moves the medical instrument 4 in the insertion direction of the medical instrument 4 into a patient P. The translational movement mechanism 70 is configured to translationally move the medical instrument 4 relative to the arm portion 61. Specifically, the translational movement mechanism 70 is provided with the holder 71 configured to hold the medical instrument 4. The holder 71 accommodates therein the servo-motors M2 (see FIG. 12).

Figure 7:
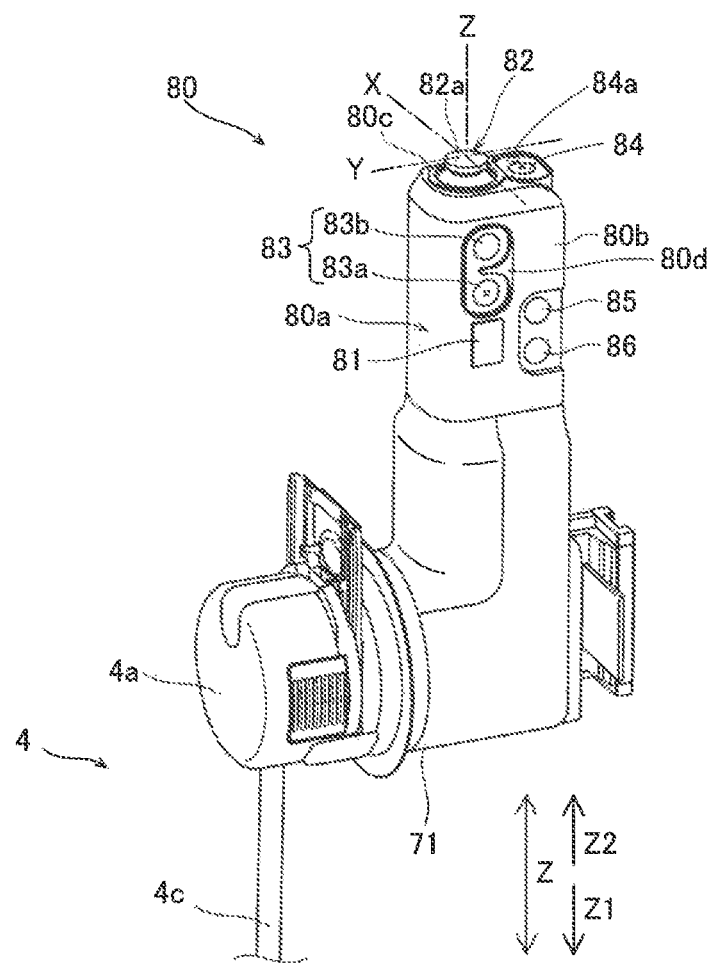
FIG. 7 is a diagram illustrating a perspective view of a configuration of an operation unit of the medical manipulator according to a first embodiment.

As illustrated in FIG. 7, the medical manipulator 1 includes an operation unit 80 (a manipulation unit 80) which is attached to each of the arms 60 to operate the arm 60. The operation unit 80 includes an enable switch 81, a joystick 82, and a switch section 83. The enable switch 81 enables or disables the joystick 82 and the switch section 83 to move the arm 60. When the enable switch 81 is being depressed by an operator (nurse, assistant, etc.) gripping the operation unit 80, the arm 60 along with the medical instrument 4 is enabled to move. Also, the joystick 82 and the switch section 83 are used to operate the arm 60. Note that the enable switch 81 is an example of an "input device" or a "switch." Further, the joystick 82 and the switch portion 83 are examples of a "manipulation member" or an "operation member."

The switch section 83 includes: a switch 83*a* for moving the medical instrument 4 in the direction in which the medical instrument 4 is inserted into the patient P along the longitudinal direction of the medical instrument 4; and a switch 83*b* for moving the distal end 4*d* of the medical instrument 4 in the direction opposite to the direction in which the medical instrument 4 is inserted into the patient P. Both the switch 83*a* and the switch 83*b* are composed of push button switches.

As illustrated in FIG. 7, the operation unit 80 includes a pivot button 85 for setting a pivot position PP that serves as a fulcrum (see FIG. 11) for the movement of the medical instrument 4 attached to the arm 60. The pivot button 85 is provided on a surface 80*b* of the operation unit 80 so as to be adjacent to the enable switch 81. The pivot position PP is set by pressing the pivot button 85 in a state where the distal end of the endoscope 6 (see FIG. 8) or the distal end of the pivot position setting device 7 (FIG. 9) is moved to a position corresponding to an insertion position of the trocar T inserted into the body surface S of the patient P. The pivot position PP set is stored in the storage 32. In the teaching of the pivot position PP, the pivot position PP is set as one point (coordinate), but the teaching of the pivot position PP does not set the direction of the medical instrument 4.

As illustrated in FIG. 1, the endoscope 6 is attached to one (for example, the arm 60*c*) of the plural arms 60, and the medical instruments 4 other than the endoscope 6 are attached to the other arms 60 (for example, the arms 60a, 60b, and Specifically, in surgery, the endoscope 6 is attached to one of the four arms 60, and the medical instruments 4 (forceps 4b, etc.) other than the endoscope 6 are attached to the other three arms 60. In the state where the endoscope 6 is attached to the arm 60, the pivot position PP for the endoscope 6 is set to the arm 60 to which the endoscope 6 is attached. Further, in the state where the pivot position setting device 7 is attached to the arm 60 to which the medical instrument 4 other than the endoscope 6 is attached, the pivot position PP for the medical instrument 4 is set to the arm 60 to which the medical instrument 4 other than the endoscope 6 is attached. The endoscope 6 is attached to one of two arms 60 (arms 60b and 60c) arranged in the center area among the four arms 60 arranged adjacent to each other. That is, the pivot position PP is individually set for each of the plurality of arms 60.

As illustrated in FIG. 7, the surface 80b of the operation unit 80 is provided with an adjustment button 86 for optimizing the position of the arm 60. After the pivot position PP is set to the arm 60 to which the endoscope 6 is attached, the positions of the other arms 60 (arm bases 50) are optimized by pressing the adjustment button 86.

As illustrated in FIG. 7, the operation unit 80 includes a mode switch button 84 for switching between a translational movement mode (see FIG. 10) to translationally move the medical instrument 4 attached to the arm 60 and a rotational movement mode (see FIG. 11) for rotationally move the medical instrument 4 attached to the arm 60. In the vicinity of the mode switch button 84, a mode indicator 84a is provided. The mode indicator 84a indicates the switched (selected) mode (the translational movement mode or the rotational movement mode). Specifically, when the mode indicator 84a is turned on (rotational movement mode) or off (translational movement mode), the current mode (translational movement mode or rotational movement mode) is indicated.

Further, the mode indicator 84a also serves as a pivot position indicator that indicates that the pivot position PP has been set.

Figure 10:
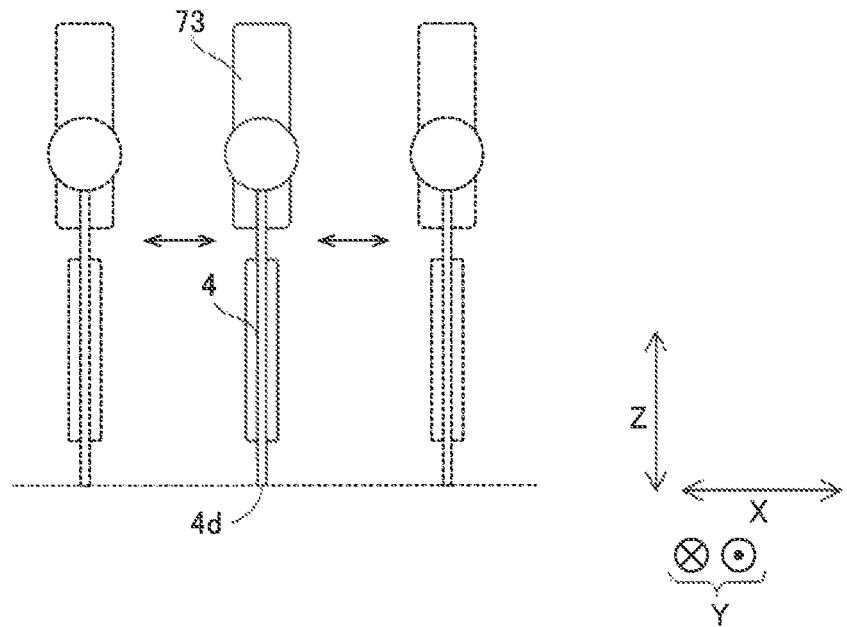
FIG. 10 is a diagram illustrating a view for explaining translational movements of the arm.
Figure 11:
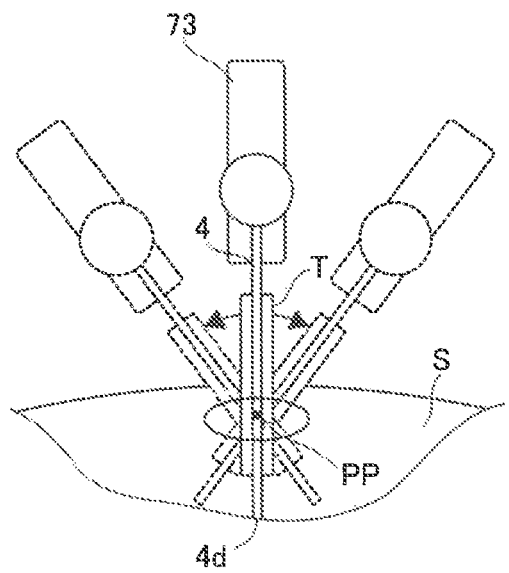
FIG. 11 is a diagram illustrating a view for explaining rotational movements of the arm.

As illustrated in FIG. 10, in the translational movement mode to translationally move the arm 60, the arm 60 is moved in such a manner that the distal end 4d of the medical instrument 4 moves on the XY plane. Further, as illustrated in FIG. 11, in the rotational movement mode in which the medical instrument 4 is to be rotationally moved, when the pivot position PP is not set by the operator, the arm 60 is moved such that the medical instrument 4 is rotated around the forceps 4b, and when the pivot position PP is set by the operator, the arm 60 is moved such that the medical instrument 4 is rotated around the pivot position PP as a fulcrum. The medical instrument 4 is rotationally moved in the state where the shaft 4c of the medical instrument 4 is inserted in the trocar T.

As illustrated in FIG. 12, the arm 60 is provided with the plurality of servomotors M1, a plurality of encoders E1, and a plurality of speed reducers (not illustrated), so as to correspond to the plurality of joint portions 64 of the arm portion 61. The encoder E1 is configured to detect the rotation angle of the servomotor M1. The speed reducer is configured to reduce the rotation of the servomotor M1 to increase the torque.

As illustrated in FIG. 12, the translational movement mechanism 70 includes the servomotors M2 for rotating the rotors (rotation members) provided in the driven unit 4a of the medical instrument 4, a servomotor M3 for translationally moving the medical instrument 4, encoders E2, an encoder E3, and speed reducers (not illustrated). The encoders E2 and the encoder E3 are configured to detect the rotation angles of the servomotors M2 and the servomotor M3, respectively. The speed reducers are configured to reduce the rotations of the servomotors M2 and the servomotor M3 to increase the torque thereof.

The positioner 40 is provided with a plurality of servomotors M4, a plurality of encoders E4, and a plurality of speed reducers (not illustrated), so as to correspond to the plurality of joints 43 of the positioner 40. The encoders E4 detect the rotation angles of the servomotors M4. The speed reducers are configured to reduce the rotations of the servomotors M4 to increase the torque thereof.

The medical trolley 3 is provided with servomotors M5 that drive a plurality of front wheels (not illustrated) of the medical trolley 3 respectively, encoders E5, speed reducers (not illustrated), and brakes (not illustrated). The speed reducer is configured to reduce the rotation of the servomotor M5 to increase the torque. A throttle 34a of the medical trolley 3 is provided with a potentiometer P1 (see FIG. 1). The servomotors M5 for the front wheels are driven based on the rotation angle detected by the potentiometer P1 according to the rotation of the throttle portion 34a. The rear wheels (not illustrated) of the medical trolley 3 are a twin-wheel type and are steered based on the left-right rotation of an operation handle 34. The operation handle 34 of the medical trolley 3 is provided with a potentiometer P2 (see FIG. 2). The rear wheels of the medical trolley 3 are provided with servomotors M6, encoders E6, and speed reducers (not illustrated). The speed reducer is configured to reduce the rotation of the servomotor M6 to increase the torque. The servomotors M6 for the rear wheels are driven based on the rotation angle detected by the potentiometer P2 according to the left-right rotation of the operation handle 34. That is, the steering of the rear wheels by the left-right rotation of the operation handle 34 is power-assisted by the servomotors M6.

Further, the medical trolley 3 moves in the front-rear direction by driving the front wheels. By rotating the operation handle 34 of the medical trolley 3, the rear wheels of the medical trolley 3 are steered and thus the medical trolley 3 is rotated in the left-right direction.

The control unit 31 of the medical trolley 3 includes an arm control unit 31a that controls the movement of the plurality of arms 60 based on commands, and a positioner control unit 31b that controls the movement of the positioner 40 and driving of the front wheel (not illustrated) of the medical trolley 3 based on commands. A servo control unit C1 that controls the servomotors M1 for driving the arm 60 is electrically connected to the arm control unit 31a. Further, an encoder E1 that detects the rotation angle of the servomotor M1 is electrically connected to the servo control unit C1.

A servo control unit C2 that controls the servomotors M2 for driving the medical instrument 4 is electrically connected to the arm control unit 31a. The encoders E2 that detect the rotation angles of the servomotors M2 are electrically connected to the servo control unit C2. The servo control unit C3 that controls the servomotor M3 for translationally moving by the translation movement mechanism 70 is electrically connected to the arm control unit 31a. The encoder E3 for detecting the rotation angle of the servomotor M3 is electrically connected to the servo control unit C3.

The operation command inputted to the remote control apparatus 2 is inputted to the arm control unit 31a. The arm control unit 31a generates position commands based on the operation command inputted and the rotation angles detected by the encoders E1 (E2, E3), and outputs the position commands to the servo control units C1 (C2, C3). The servo control units C1 (C2, C3) generate torque commands based on the position commands inputted from the arm control unit 31a and the rotation angles detected by the encoders E1 (E2, E3), and output the torque commands to the servomotors M1 (M2, M3). As a result, the arm 60 is moved so as to comply with the operation command inputted to the remote control apparatus 2.

As illustrated in FIG. 12, the control unit 31 (arm control unit 31a) is configured to operate the arm 60 based on an input signal from the joystick 82 of the operation unit 80. Specifically, the arm control unit 31a generates position commands based on the input signal (operation command) inputted from the joystick 82 and the rotation angles detected by the encoders E1, and outputs the position commands to the servo control units C1. The servo control unit C1 generates torque commands based on the position command inputted from the arm control unit 31a and the rotation angles detected by the encoders E1, and outputs the torque commands to the servomotors M1. As a result, the arm 60 is moved so as to follow the operation command inputted to the joystick 82.

The control unit 31 (arm control unit 31a) is configured to operate the arm 60 based on an input signal from the switch section 83 of the operation unit 80. Specifically, the arm control unit 31a generates position commands based on the input signal (operation command) inputted from the switch section 83 and the rotation angles detected by the encoders E1 or E3, and outputs the position commands to the servo control units C1 or C3. The servo control units C1 or C3 generate torque commands based on the position command inputted from the arm control unit 31a and the rotation angles detected by the encoders E1 or E3, and outputs the generated torque commands to the servomotors M1 or M3. As a result, the arm 60 is moved so as to follow the operation command inputted to the switch section 83.

As illustrated in FIG. 12, the servo control units C4 that control the servomotors M4 for moving the positioner 40 are electrically connected to the positioner control unit 31b. The encoders E4 that detects the rotation angles of the servomotors M4 are electrically connected to the servo control units C4. The servo control units C5 that control the servomotors 5 for driving the front wheel (not illustrated) of the medical trolley 3 are electrically connected to the positioner control unit 31b. The encoders E5 that detect the rotation angles of the servomotors M5 are electrically connected to the servo control units C5.

An operation command regarding setting of the preparation position and the like is inputted from the input device 33 to the positioner control unit 31b. The positioner control unit 31b generates position commands based on the operation command inputted from the input device 33 and the rotation angle detected by the encoder E4, and outputs the position commands to the servo control units C4. The servo control unit C4 generates torque commands based on the position command inputted from the positioner control unit 31b and the rotation angles detected by the encoders E4, and outputs the torque commands to the servomotors M4. As a result, the positioner 40 is moved so as to follow the operation command inputted to the input device 33. Similarly, the positioner control unit 31b moves the medical trolley 3 based on the operation command from the input device 33.

The surgical operation system 100 includes the image processing device 8b. The image processing device 8b is configured to execute processing based on predetermined programs. The image processing device 8b is configured by a computer. The image processing device 8b includes a processor such as a CPU that executes programs, and a storage section such as a memory that stores the programs. The image processing device 8b is configured to generate a graphical user interface G (see FIG. 14) and display, on the monitor 24 of the remote control apparatus 2, the graphical user interface G superimposed on the endoscope image (see FIG. 13) captured by the endoscope 6. The image processing device 8b is also configured to display, on the display 8a (screen), the graphical user interface G superimposed on the endoscope image captured by the endoscope 6. The image processing device 8b is configured to obtain the image from the endoscope 6.

Figure 14:
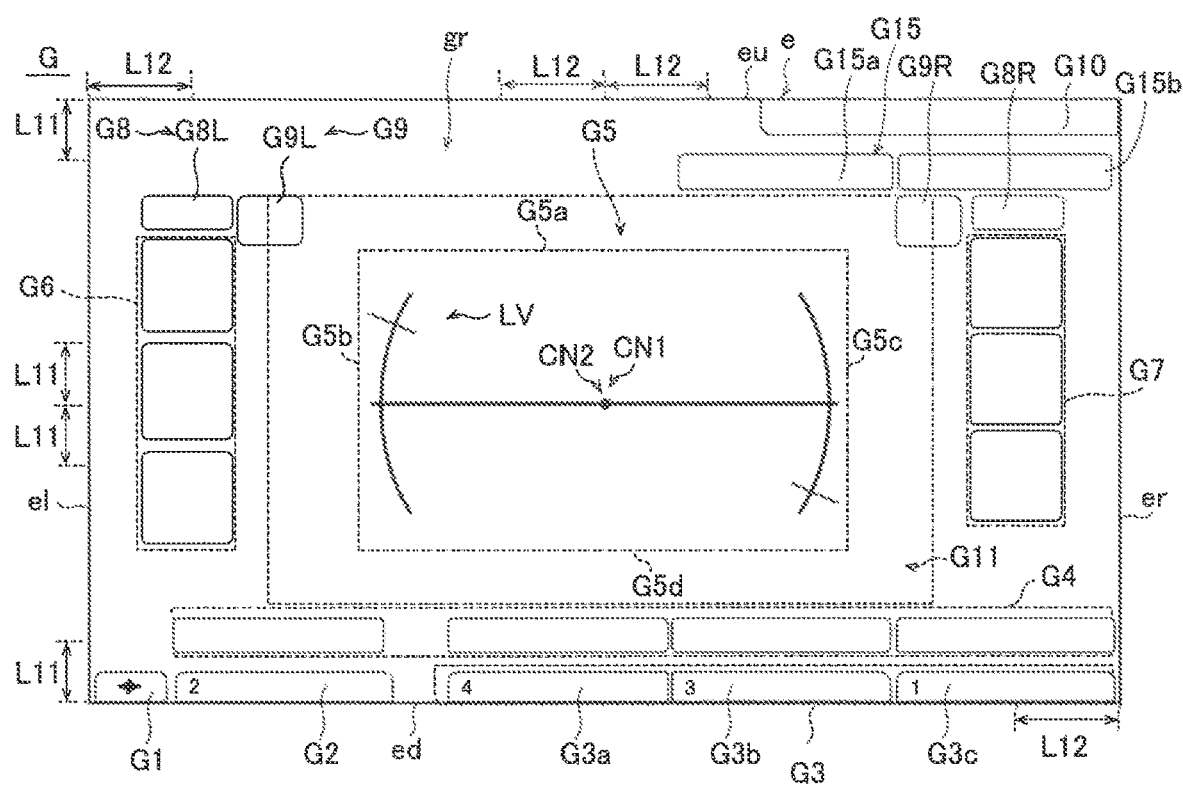
FIG. 14 is a diagram illustrating a view of the graphical user interface including a plurality of areas.
Figure 15A:
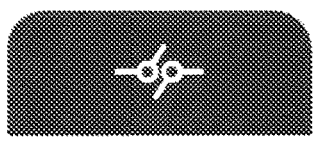
FIGS. 15A, 15B, and 15C are diagrams for explaining display states of a clutch area.
Figure 15B:
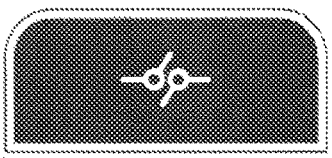
Figure 15C:
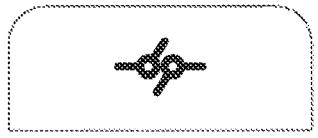
Figure 16:
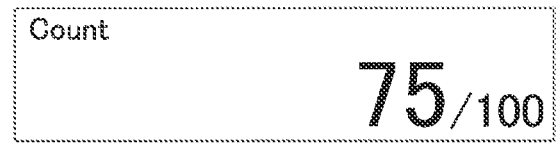
FIG. 16 is a diagram for explaining a display state of a medical equipment usage information area.

As illustrated in FIG. 14, the graphical user interface G includes a clutch area G1. A state of the clutch pedal 22b is displayed in the clutch area G1 as illustrated in FIGS. 15A, 15B, and 15C. FIG. 15A illustrates the clutch area in a state (OFF state) in which the clutch pedal 22b is not depressed. FIG. 15B illustrates the clutch area in a state (hover state) in which the operator puts his/her foot on the clutch pedal 22b. FIG. 15C illustrates the clutch area in a state (ON state) in which the clutch pedal 22b is depressed.

As illustrated in FIG. 14, in a first embodiment, the graphical user interface G includes a camera area G2 indicating information relating to the endoscope 6. The camera area G2 is displayed in an area near the lower end ed (see FIG. 13) of the screen gr of the monitor 24.

As illustrated in FIG. 14, the graphical user interface G includes hand areas G3. The hand areas G3 display information of the medical instruments 4 attached to the arms 60 and indicates operation states of the medical instruments 4 attached to the arms 60 (and thus may serve as medical instrument operation state indicators). The hand areas G3 include: a hand area G3a that displays information about the arm 60a (the arm 60a having the identification number "4") and the medical instrument 4 attached to the arm 60a that are operated by the operation handle 21L for the left hand, a hand area G3b that displays information about the arm 60b (the arm 60b having the identification number "3") and the medical instrument 4 for replacement that is attached to the arm 60b, and a hand area G3c that displays information about the arm 60d (the arm 60d having the identification number "1") and the medical instrument 4 that is attached to the arm 60d that are operated by the operation handle 21R for the right hand. The hand areas G3 are displayed in an area in the vicinity of the lower end ed of the screen gr of the monitor 24. The clutch area G1 is also displayed in the area in the vicinity of the lower end ed of the screen gr of the monitor 24. Specifically, as illustrated in FIG. 14, the clutch area G1, the camera area G2, and the hand area G3 are displayed between the lower end ed of the screen gr and a position above the lower end ed of the screen gr by a length (L11) of one tenth of the vertical length of the screen gr.

The information about the arm 60 include: the identification number (e.g., "1", "2", etc.) of the arm 60; and an arrow icon that is displayed when the arm 60 is set as a replacement destination of an arm 60 to which the medical instrument 4 for replacement is attached. The information about the medical instrument 4 include a name (a type) of the medical instrument 4. The information about the medical instrument 4 also includes the information regarding the operation state of the medical instrument 4, e.g., indication of whether the clutch pedal 22b, the coagulation pedal 22e, the cutting pedal 22d, or the like for the medical instrument 4 is being operated or not.

Figure 13:
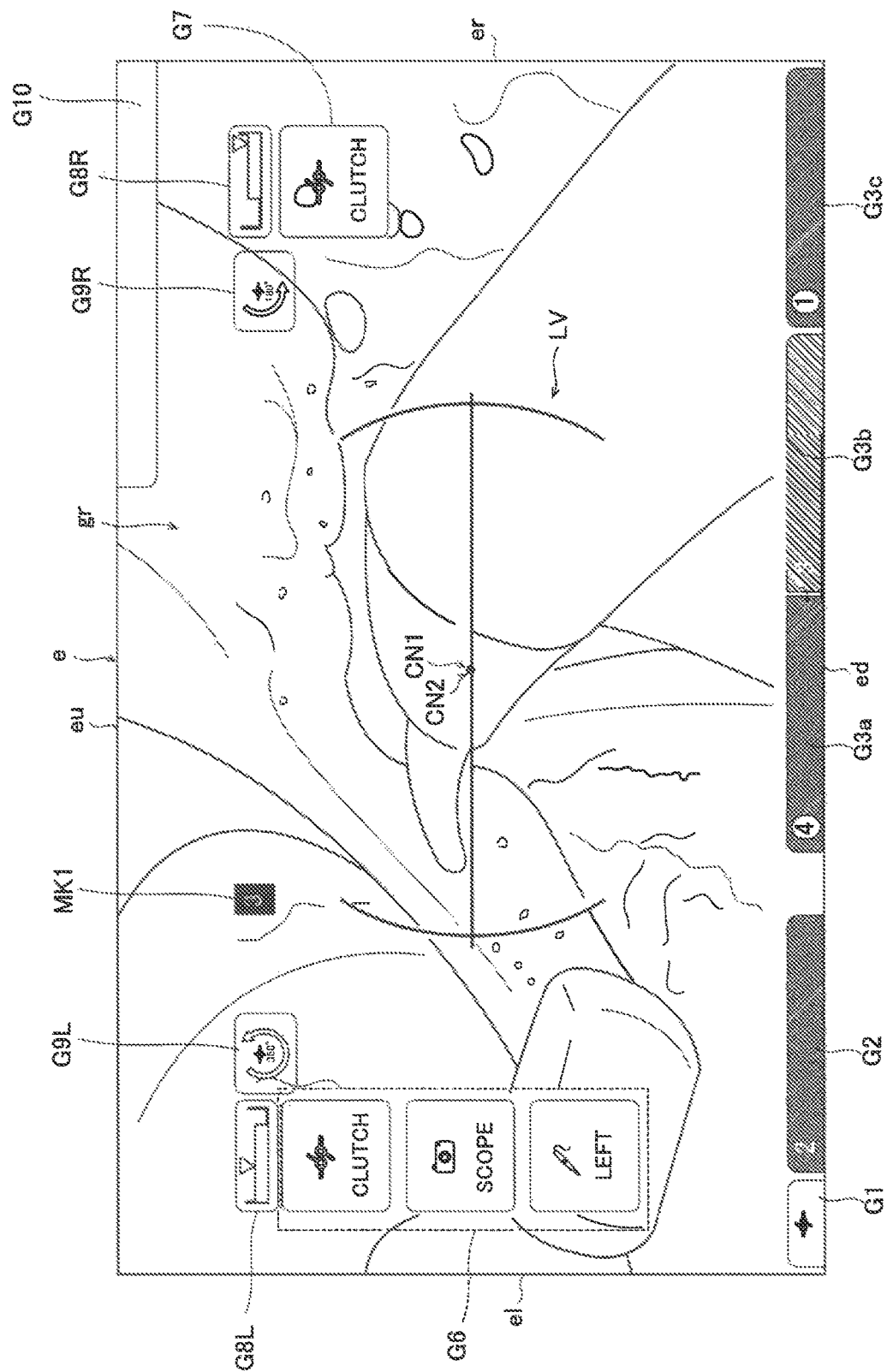
FIG. 13 is a diagram illustrating an image captured by the endoscope and a graphical user interface.

Further, as illustrated in FIG. 13, the hand areas (hand area G3a and hand area G3c) for the arms 60 that are operation targets to be operated are displayed in dark gray. In these dark gray hand areas G3a and G3c, the identification numbers "1" and "4" of the arms 60 that are the operation targets are displayed in white ovals (white elongate circles). Further, the hand area (hand area G3b) of the arm 60 that is not the operation target is displayed in light gray, and in this hand area G3b, the identification number "3" of that arm 60 is displayed in an even lighter gray color lighter than the light gray color of the hand area G3b.

As illustrated in FIG. 14, the graphical user interface G includes a medical instrument usage information area G4, which is a pop-up area. In the medical instrument usage information area G4, the current number of times of use/the maximum number of times of use (see FIG. 16) of the medical instrument 4 attached to each arm 60 is displayed in a pop-up. When the current number of uses of the medical instrument becomes equal to the maximum number of uses of the medical instrument, the current number of uses is displayed in red. When an error occurs in the medical instrument 4 attached to any one of the arms 60, error information is displayed in a pop-up manner. When the medical instrument 4 is not attached to the arm 60, nothing is displayed in the medical instrument usage information area G4. The medical instrument usage information area G4 is displayed in an area adjacent above the clutch area G1, the camera area G2, and the hand area G3 on the monitor 24.

As illustrated in FIG. 14, the graphical user interface G includes a level indication area G5. In the level indication area G5, information on the angle of the endoscope 6 is displayed. The level indication area G5 is displayed only while the camera pedal 22c is being depressed (stepped). That is, when receiving the command that enables the movement of the endoscope 6, the image processing device 8b displays a level LV (a level indication LV) of the endoscope 6 in the level indication area G5. The level indication area G5 is an example of a "center area".

Figure 17A:
FIGS. 17A, 17B, and 17C are diagrams for explaining display states of a left pop-up area.
Figure 17B:
Figure 17C:
Figure 18:
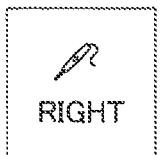
FIG. 18 is a diagram for explaining a display state of the right pop-up area.

As illustrated in FIG. 14, the graphical user interface G includes a left pop-up area G6. In the left pop-up area G6, the icons illustrated in FIGS. 17A to 17C are displayed in the hover state, which is a state where the foot of the operator is placed on the foot pedal 22. FIG. 17A illustrates an icon displayed when the foot is placed on the coagulation pedal 22eL or the cutting pedal 22dL. FIG. 17B illustrates an icon displayed when the foot is placed on the clutch pedal 22b. FIG. 17C illustrates an icon displayed when the foot is placed on the camera pedal 22c. The left pop-up area G6 is displayed in a left side portion on the monitor 24.

As illustrated in FIG. 14, the graphical user interface G includes a right pop-up area G7. In the right pop-up area G7, an icon (FIG. 18) is displayed when the foot is placed on the coagulation pedal 22eR or the cutting pedal 22dR. The right pop-up area G7 is displayed in a right side portion on the monitor 24.

Further, as illustrated in FIG. 14, the graphical user interface G includes the first area G8 that displays the movable range of the arm 60 and the operable range of the operation handle 21 where the operation handle 21 is operable in the movable range of the arm 60. The graphical user interface G also includes a second area G9 that displays a direction in which the operation handle 21 is required to be operated to return the operation handle 21 to the inside of the operable range of the operation handle (toward the center of the operable range of the operation handle) and/or (e.g., "and" in a first embodiment) to return the arm 60 to the inside of the movable range (toward the center of the movable range of the arm 60).

Further, the number of arms 60 that can be operated by the operation handle 21 is two. For example, the operation handle 21L operates the left arm 60L (for example, the arm 60a, see FIG. 1) that supports the medical instrument 4. Further, the operation handle 21R operates the right arm 60R (for example, the arm 60d, see FIG. 1) that supports the medical instrument 4. The first area G8 includes a first area G8L for the left arm 60L and a first area G8R for the right arm 60R, and the second area G9 includes a second area G9L for the left arm 60L and a second area G9R for the right arm 60R.

As illustrated in FIG. 14, the graphical user interface G includes error notification areas G15 (G15a, G15b) The error notification area G15a is displayed in a pop-up to display warning and error information when a warning or an error occurs. The error notification area G15b is displayed in a pop-up to display details of notes of the warning and the error displayed in the error notification area G15a.

Figure 19:
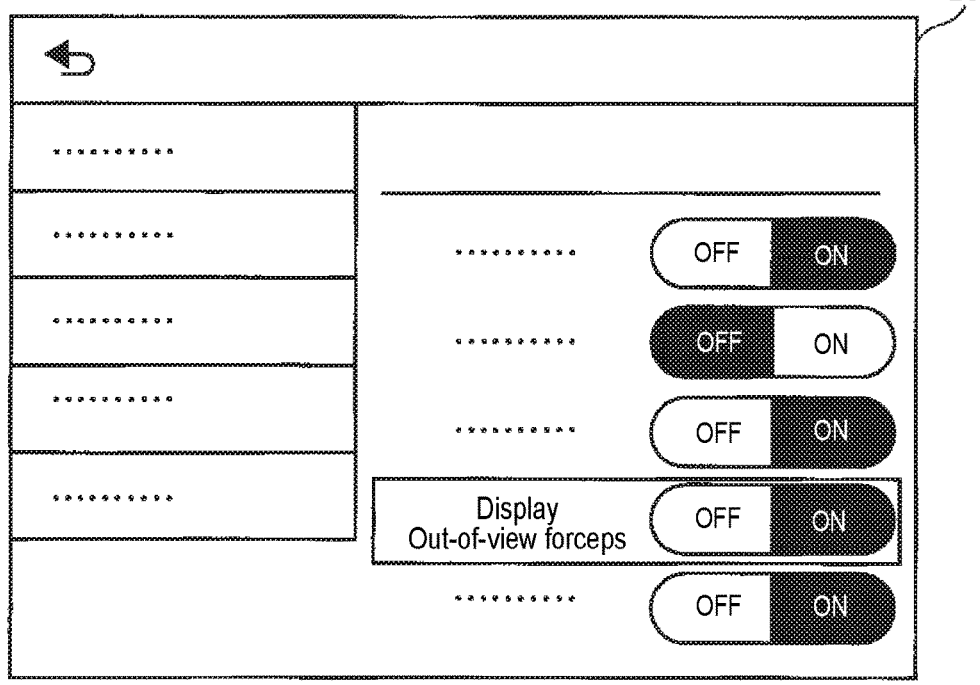
FIG. 19 is a diagram for explaining a display state of a touch panel of a remote control apparatus.
Figure 25:
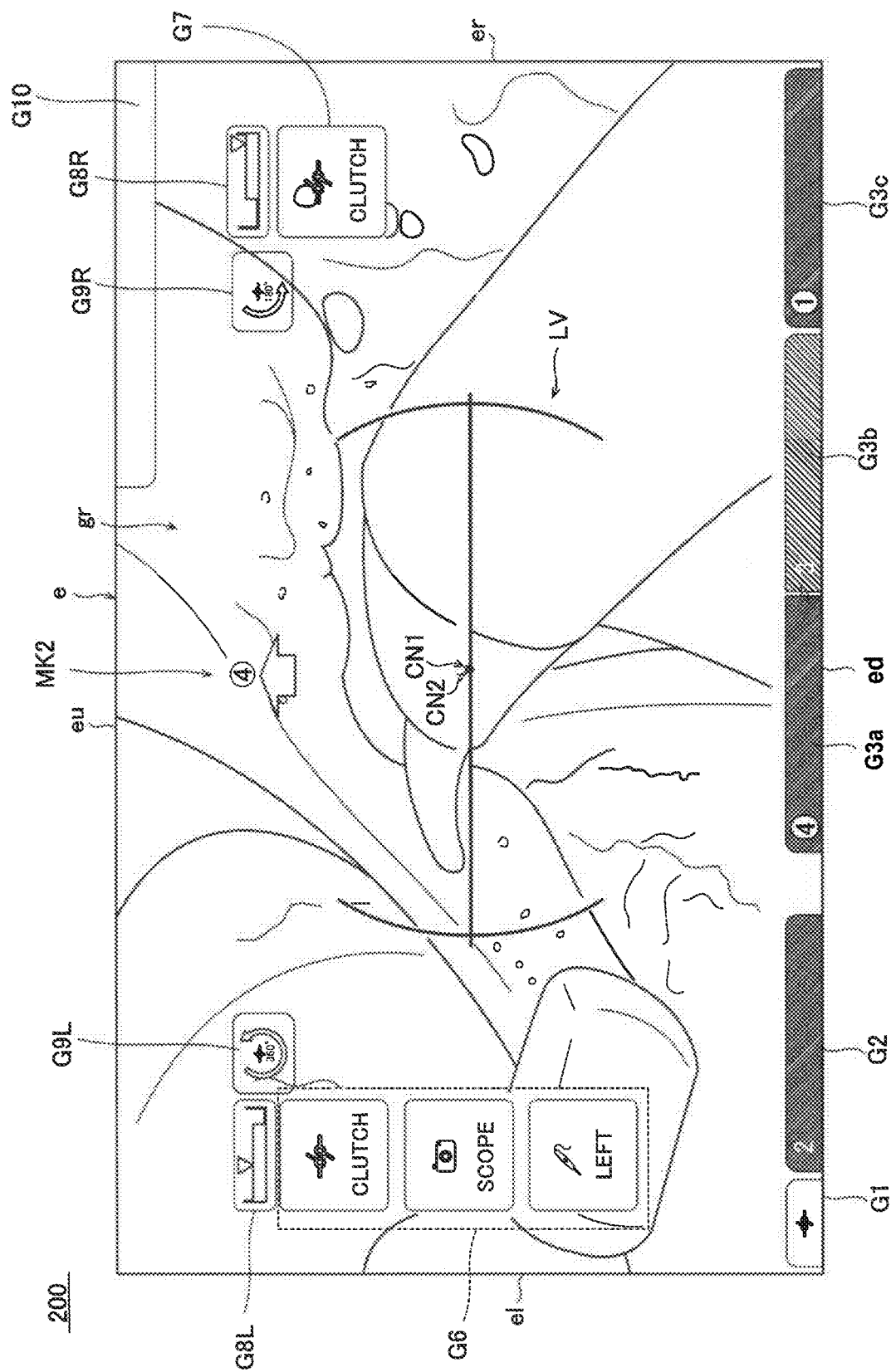
FIG. 25 is a diagram for explaining a graphical user interface including a mark on an image captured by an endoscope according to a second embodiment.

The image processing device 8b is configured to be switchable between a displayable mode and a non-displayable mode, wherein a mark MK1 (marker, indicator) such as being illustrated in FIG. 13 (or a mark MK2 (marker, indicator) such as being illustrated in FIG. 25 according to a second embodiment) that corresponds to the medical instrument 4 located outside the field of view of the endoscope 6 is displayable in the displayable mode and is not displayable in the non-displayable mode. Specifically, as illustrated in FIG. 19, in response to operation on the touch panel 23 of the remote control apparatus 2, "ON" and "OFF" buttons for turning on and off an "Out-of-view forceps display" are displayed. In a state where the "ON" for the "Out-of-view forceps display" setting is selected, the image processing device 8b displays, in response to a predetermined input inputted through the camera pedal 22c by the operator, the mark MK1 (or the mark MK2 according to a second embodiment) if the medical instrument 4 is located outside the field of view of the endoscope 6. In a state where the "OFF" for the "Out-of-view forceps display" setting is selected, the mark MK1 (or the mark MK2 according to a second embodiment) is not displayed. With this configuration, the display setting of the "out-of-view forceps display" can be easily switched in consideration of the skill level of the operator's operation and the needs of the operator.

As illustrated in FIG. 14, the graphical user interface G includes a status area G10. In the status area G10, information such as the remaining amount of the built-in battery of the medical manipulator 1, the brightness/contrast of the monitor 24, the lap time, and the elapsed time of the surgery are displayed. Specifically, as illustrated in FIG. 14, the status area G10 is displayed between the upper end eu of the screen gr and a position below the upper end eu of the screen gr by a length (L11) of one tenth of the vertical length of the screen gr.

In a first embodiment, as illustrated in FIGS. 13 and 14, the image processing device 8b is configured, in response to the predetermined input through the camera pedal 22c or the enable switch 81 when at least one of the medical instruments 4 is located outside the field of view of the endoscope, the mark MK1 corresponding to the medical instrument 4 that is located outside the field of view of the endoscope, in an inner area of the graphical user interface G which does not include the vicinity of the peripheral edge of the display screen (which is located on an inner side than the vicinity of the peripheral edge of the display screen). Specifically, the image processing device 8b is configured to displays, the mark MK1 in a neighborhood area G11 that is provided in the vicinity of the peripheral edge (the outer edge) of the level indication area G5 of the graphical user interface G. That is, the mark MK1 (the graphical user interface G) is displayed in the neighborhood area G11 which is provided in the vicinity of the peripheral edge of the level indication area G5 including the center CN1 of the monitor screen gr and does not include the vicinity of the peripheral edge e (eu, ed, el, and er) of the monitor screen gr. Note that the neighborhood area G11 is located outside a level indication LV and in the vicinity of and adjacent to the level indication LV.

Further, in a first embodiment, the image processing device 8b is configured, in response to the predetermined input through the camera pedal 22c, which is different from a camera movement operation input through the camera pedal 22c to move the endoscope 6, to display the mark MK1 on the graphical user interface G. For example, the image processing device 8b is configured, in response to the camera pedal 22c being operated twice in row within a predetermined time (a double click operation on the camera pedal) as the predetermined input, which is different from the camera movement operation inputted through the camera pedal 22c, to display the mark MK1 on the graphical user interface G.

Note that when the predetermined input on the camera pedal 22c, which is different from the camera movement operation on the camera pedal 22c is received, the image processing device 8b is configured to enable the operation handles 21L and 21R to operate the medical instrument 4. That is, when the predetermined input on the camera pedal 22c, which is different from the camera movement operation on the camera pedal 22c, is received, the endoscope 6 is not enabled to move by the operation handles 21L and 21R.

Further in a first embodiment, the image processing device 8b is configured, in response to the enable switch 81 attached to the arm 60 being operated as a predetermined input on the enable switch 81, to display the mark MK1 on the graphical user interface G. That is, when an operator such as an assistant or a nurse presses the enable switch 81 to move the arm 60, the marker MK1 is displayed on the graphical user interface G.

The image processing device 8b is configured to switch between a state in which the mark MK1 is displayable and a state in which the mark MK1 is not displayable. Specifically, the image processing device 8b is configured to display the mark MK1 on the graphical user interface G only when the predetermined input is made through the camera pedal 22c or the enable switch 81.

Note that the image processing device 8b is configured to determine whether or not each of the medical instruments is positioned outside the field of view of the endoscope 6, based on imaging range information of the endoscope 6 and the position information of the distal ends of the medical instruments 4 supported by the arms 60. That is, the image processing device 8b acquires the position of the medical instrument 4 based on the posture and the position of the arm 60 to which the medical instrument is attached. Also, the image processing device 8b acquires the imaging direction of the endoscope 6 based on the posture and the position of the arm 60. Further, the image processing device 8b acquires the field angle (field of view range) of the endoscope 6 based on the zoom state of the endoscope 6. The image processing device 8b obtains the field angle (field of view range) of the endoscope 6 with reference to values of the mechanical system (lens, etc.) of the endoscope 6. Then, the image processing device 8b obtains the coordinates of the distal end of the medical instrument 4 with respect to the field of view of the endoscope 6, based on the information on the field of view of the endoscope 6, the posture and the position of the endoscope 6, and the position of the arm 60. With this, the image processing device 8b determines whether each of the medical instruments 4 is located outside the field of view of the endoscope 6.

In the example illustrated in FIGS. 13 and 14, the medical instruments 4 (the medical instruments 4 such as the forceps 4b other than the endoscope 6) are respectively attached to the arm 60a (corresponding to the hand area G3a having the identification number "4"), the arm 60b (corresponding to the hand area G3b having the identification number "3"), the arm 60d (corresponding to the hand area G3c having the identification number "1") among the arms 60a, 60b, 60c, and 60d. The endoscope 6 is attached to the arm 60c (corresponding to the camera area G2 having the identification number "2"). The arm 60a (corresponding to the hand area G3a having the identification number "4") and the arm 60d (corresponding to the hand area G3c having the identification number "1") are in the active states in which the arm 60a and 60d are allowed to be operated by the operation handle(s) 21, and the hand areas G3a and G3c corresponding to these arms 60a and 60d are displayed in dark gray. To the contrary, the arm 60b is in the inactive state in which the arm 60b is not allowed to be operated by the operation handle(s) 21, and the hand area G3b corresponding the arm 60b is displayed in light gray.

An example illustrated in FIG. 13, the medical instrument 4 attached to the arm 60a (corresponding to the hand area G3a having the identification number "4") and the medical instrument 4 attached to the arm 60d (corresponding to the hand area G3c having the identification number "1") are located in the field of view of the endoscope 6. To the contrary, the medical instrument 4 attached to the arm 60b (corresponding to the hand area G3b having the identification number "3") is located outside the field of view of the endoscope 6.

In a first embodiment, the image processing device 8b is configured to display the mark MK1 at a region, in the neighborhood area G11 of the level indicator display area G5, displaced from the level indication area G5 in a deviation direction in which the medical instrument 4 that is outside the field of view of the endoscope is deviated from the field of view of the endoscope. That is, the graphical interface G is displayed such that the mark MK1 that indicates the medical instrument 4 that is located outside the field of view of the endoscope 6 is arranged in one of the regions G12 (see G12a, G12b, G12c, G12d, G12e, G12f, G12g, and G12h in FIG. 20), in the neighborhood area G11, that is deviated from the center CN2 of the level indication area G5 in the direction in which the medical instrument 4 is deviated from the field of view of the endoscope 6. In FIG. 13, the mark MK1 (the letter of the number "3") is displayed.

Figure 20:
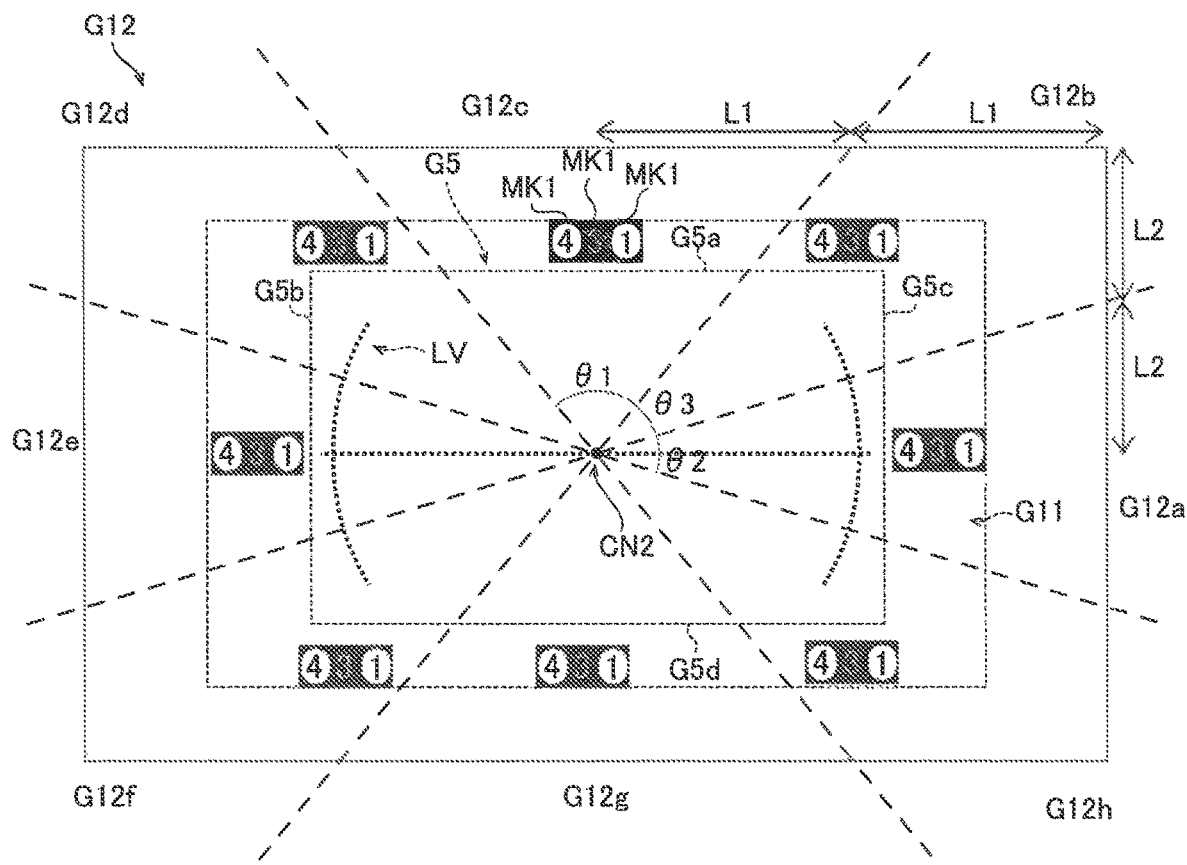
FIG. 20 is a diagram for explaining examples of marks according to a first embodiment.

As illustrated in FIG. 20, the mark MK1 indicating (corresponding to) the medical instrument 4 that is located outside the field of view of the endoscope 6 is displayed in one of the regions G12 into which the neighborhood area G11 is divided by radial lines radially extending from the center CN2 of the level indication area G5. In a first embodiment, the neighborhood area G11 is radially divided into eight regions G12 (G12a, G12b, G12c, G12d, G12e, G12f, G12g, and G12h) by the radial lines radially extending from the center CN2 of the level indication area G5. In FIG. 13, the mark MK1 (the letter of the number "3") is displayed in the upper left area G12d (see FIG. 20), as an example.

Note that FIG. 20 illustrates all of the display patterns in which the medical instruments 4 of the identification numbers "1", "3", and "4" are located outside the field of view of the endoscope 6.

In addition, as illustrated in FIG. 20, the image processing device 8*b* is configured to display the mark MK that indicates which direction the medical instrument 4 is deviated from the field of the view of the endoscope, e.g., the image processing device 8*b* is configured to display the mark MK that indicates which region the medical instrument 4 is located among eight regions into which an out-of-field area (an area outside of the field of view of the endoscope) is divided according to the shape of the rectangular display whose vertical and horizontal lengths are not equal.

Further, as illustrated in FIG. 20, the horizontal length of the display (screen) is greater than the vertical length of the display. The eight divided regions G12*a*, G12*b*, G12*c*, G12*d*, G12*e*, G12*f*, G12*g*, and G12*h* are provided such that angles 81 of the upper region G12*c* and the lower region G12*g* are larger than angles 82 and 83 of the right region G12*a*, the left region G12*e*, and the upper right region G12*e*, the upper left region G12*d*, the lower right region G12*h*, and the lower left region G12*f*.

Further, as illustrated in FIG. 20, the aspect ratio (vertical-to-horizontal ratio) of a peripheral edge (outer edge) of the neighborhood area G11 is the same as that of the display. For example, the aspect ratio of the peripheral edge of the neighborhood area G11 and the aspect ratio of the peripheral edge of the display are 16:9 (horizontal length:vertical length).

As illustrated in FIG. 20, the peripheral edge of the display gr including upper, lower, right, and left sides of the display gr is divided into eight line segments by the radial lines that divides the mark display area G11 into the eight divided regions, wherein lengths of the line segments corresponding to the upper region G12*c* and the lower region G12*g* are greater than lengths of the line segments corresponding to the right region G12*a*, the left region G12*e*, the upper right region G12*d*, the upper left region G12*b*, the lower right region G12*f*, and the lower left region G12*h*.

The mark display area G11 (or the out-of-field area) is divided into the eight divided regions by (i) the straight line connecting a point right from the left end of the upper side of the display by a length of 1/n of the upper side of the display and a point left from the right end of the lower side of the display by a length of 1/n of the lower side of the display, (ii) the straight line connecting a point left from the right end of the upper side by the length of 1/n of the upper side and a point right from the left end of the lower side by the length of 1/n of the lower side, (iii) the straight line connecting a point lower from the upper end of the left side of the display by a length of 1/n of the left side and a point upper from the lower end of the right side by a length of 1/n of the right side, and (iv) the straight line connecting a point upper from the lower end of the left side of the display by the length of 1/n of the left side and a point lower from the upper end of the right side by the length of 1/n of the right side. Here, "n" is greater than 3 and less than 8. For example, the mark display area G11 (or the out-of-field area) is divided into the eight divided regions by (i) the straight line connecting the point right from the left end of the upper side of the display by a length (L1) of ¼ of the upper side of the display and the point left from the right end of the lower side of the display by the length (L1) of ¼ of the lower side of the display, (ii) the straight line connecting the point left from the right end of the upper side by the length (L1) of ¼ of the upper side and the point right from the left end of the lower side by the length (L1) of ¼ of the lower side, (iii) the straight line connecting the point lower from the upper end of the left side of the display by a length (L2) of ¼ of the left side and the point upper from the lower end of the right side by the length (L2) of ¼ of the right side, and (iv) the straight line connecting the point upper from the lower end of the left side of the display by the length (L2) of ¼ of the left side and the point lower from the upper end of the right side by the length (L2) of ¼ of the right side. In the example illustrated in FIG. 20, the quarter length (¼) of each of the upper and lower sides of the display is L1, and the quarter length of each of the right and left sides of the display is L2.

For example, in the case of a screen with the ratio of the horizontal length to the vertical length being 16:9, the angle 81 of each of the upper region G12*c* and the lower region G12*g* is approximately 41.6 degrees, and the angle 82 of each of the right region G12*a* and the left region G12*e* is approximately 31.4 degrees, and the angle 83 of each of the upper right region G12*b*, the upper left region G12*d*, the lower right region G12*h*, and the lower left region G12*f* is approximately 32.7 degrees.

Further, the image processing device 8*b* is configured such that each of the eight divided regions of the neighborhood area G11 includes a predetermined position therein to display the mark MK1.

Also, as illustrated in FIG. 14, when receiving the command that enables the movement of the endoscope 6, the image processing device 8*b* displays the level indication LV of the endoscope 6 in the level indication area G5. That is, the image processing device 8*b* displays the level indicator of the endoscope 6 in the level indicator display area G5 of the graphical user interface G while the camera movement operation is being performed on the camera pedal 22*c* (while the camera pedal 22*c* is being operated to move the endoscope 6). The image processing device 8*b* displays, on the monitor 24, the graphical user interface G to display the mark MK1 in the neighborhood area G11 in the vicinity of the peripheral edge (the outer edge) of the level indication area G5. The level indication LV indicates the inclination of the field of view of the endoscope 6 with respect to the patient P.

As illustrated in FIG. 14, the level indication area G5 is a rectangular area (a rectangular shape elongated in the lateral direction) a peripheral edge of which includes an upper side G5*a*, a left side G5*b*, a right side G5*c*, and a lower side G5*d*. In this way, by displaying the mark MK1 in the neighborhood area G11 in the vicinity of the level indication area G5 having the predetermined size including the center portion of the screen gr, the visibility of the operator can be improved. The upper side G5*a* of the level indication area G5 is provided between a position upper from the center CN1 of the screen gr of the monitor 24 by the length L11 of one tenth (¹⁄₁₀) of the vertical length of the screen gr and a position lower from the upper end eu of the screen gr by the length L11 of one tenth of the vertical length of the screen gr. It may be preferable that the upper side G5*a* of the level indication area G5 is provided between a position upper from the center CN1 of the screen gr of the monitor 24 by a length of one eighth of the vertical length of the screen gr and a position lower from the upper edge eu of the screen by the length of one eighth of the vertical length of the screen gr. It may be more preferable that the upper side G5*a* of the level indication area G5 is provided between a position upper from the center CN1 of the screen gr by a length of one sixth of the vertical length of the screen gr and a position lower from the upper edge eu of the screen by the length of one sixth of the vertical length of the screen gr.

The upper side G5a of the level indication area G5 is provided at a position lower than the status area G10 that displays the remaining battery level of the built-in battery of the medical manipulator 1, or the like.

The left side G5b of the level indication area G5 is provided between a position left from the center CN1 of the screen gr of the monitor 24 by the length L12, which is one tenth (1/10) of the horizontal length of the screen gr, and a position right from the left end el of the screen gr by the length L12. It may be preferable that the left side G5b of the level indication area G5 is provided between a position left from the center CN1 of the screen gr of the monitor 24 by a length of one eighth of the horizontal length of the screen gr and a position right from the left end el of the screen gr by the length L12 of one eighth of the horizontal length of the screen gr. It may be more preferable that the left side G5b of the level indication area G5 is provided between a position left from the center CN1 of the screen gr of the monitor 24 by a length of one sixth of the horizontal length of the screen gr and a position right from the left end el of the screen gr by the length L12 of one sixth of the horizontal length of the screen gr.

The right side G5c of the level indication area G5 is provided between a position right from the center CN1 of the screen gr of the monitor 24 by the length L12 of one tenth of the horizontal length of the screen gr and a position left from the right end er of the screen gr by the length L12 of one tenth of the horizontal length of the screen gr. It may be preferable that the right side G5c of the level indication area G5 is provided between a position right from the center CN1 of the screen gr of the monitor 24 by a length of one eighth of the horizontal length of the screen gr and a position left from the right end er of the screen gr by the length of one eighth of the horizontal length of the screen gr. It may be more preferable that the right side G5c of the level indication area G5 is provided between a position right from the center CN1 of the screen gr of the monitor 24 by a length of one sixth of the horizontal length of the screen gr and a position left from the right end er of the screen gr by the length of one sixth of the horizontal length of the screen gr.

The lower side G5d of the level indication area G5 is provided between a position lower from the center CN1 of the screen gr of the monitor 24 by the length L11 of one tenth of the vertical length of the screen gr and a position upper from the lower end ed of the screen by the length L11 of one tenth of the vertical length of the screen gr. It may be preferable that the lower side G5d of the level indication area G5 is provided between a position lower from the center CN1 of the screen gr of the monitor 24 by a length of one eighth of the vertical length of the screen gr and a position upper from the lower end ed of the screen by the length of one eighth of the vertical length of the screen gr. It may be more preferable that the lower side G5d of the level indication area G5 is provided between a position lower from the center CN1 of the screen gr of the monitor 24 by a length of one sixth of the vertical length of the screen gr and a position upper from the lower end ed of the screen by the length of one sixth of the vertical length of the screen gr.

The lower end G5d of the level indication area G5 is provided above the hand area G3a, the hand area G3b, the hand area G3c, and the camera area G2. Further, the lower end G5d of the level indication area G5 is provided above the medical instrument usage information area G4.

Note that the center CN1 of the screen gr of the monitor 24 and the center CN2 of the level indication area G5 are provided at positions substantially same as each other.

Further, the mark MK1 indicating the medical instrument 4 that is located outside the field of view is displayed between the level indication area G5 and at least one (e.g., "all" in a first embodiment) of the medical instrument usage information area G4, the left pop-up area G6, the right pop-up area G7, and the status area G10. Note that the medical instrument usage information area G4 indicates the usage information of each medical instrument 4. The left pop-up area G6 is displayed when the foot pedal 22 is operated (that is, in the hover state where the foot is placed on the foot pedal 22). The right pop-up area G7 is displayed when the coagulation pedal 22eR or the cutting pedal 22dR is operated (that is, when the foot is placed on the coagulation pedal 22eR or the cutting pedal 22dR. The status area G10 displays the status of the surgical operation system 100.

In a first embodiment, as illustrated in FIG. 13, the mark MK1 includes the identification number to identify the arm 60 that supports the medical instrument 4 that is located outside the field of view of the endoscope 6. In an example illustrated in FIG. 13, the letter of the number "3" serving as the mark MK1 is displayed indicating that the medical instrument 4 attached to the arm 60b (corresponding to the hand area G3a having the identification number "3") is located outside the field of view of the endoscope 6.

Figure 21:
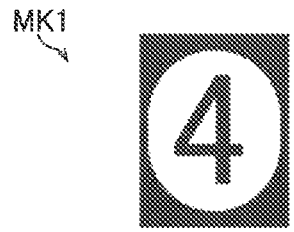
FIG. 21 is a diagram for explaining an example of a mark (for an operation target) according to a first embodiment.
Figure 22:
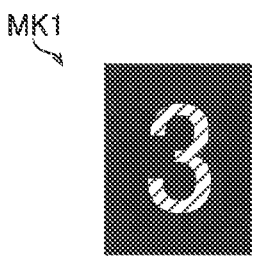
FIG. 22 is a diagram for explaining an example of a mark (for a non-operation target) according to a first embodiment.

Further, as illustrated in FIGS. 21 and 22, the mark MK1 is displayed in different manners depending on whether the medical instrument 4 located outside the field of view is an operation target or not. Specifically, as illustrated in FIG. 21, when the medical instrument 4 attached to the arm 60 is an operation target, the mark MK1 is displayed, which is the black-colored identification number (any of 1 to 4) of the arm 60 in a white oval in a black square. To the contrary, as illustrated in FIG. 22, when the medical instrument 4 attached to the arm 60 is not an operation target, the mark MK1 is displayed, which is the gray-colored identification number (any of 1 to 4) of the arm 60 in a black square.

Further, as illustrated in FIG. 20, when two or more of the medical instruments 4 among the medical instrument 4 attached to the arm 60a, the medical instrument 4 attached to the arm 60b, and the medical instrument 4 attached to the arm 60d are located outside the field of view of the endoscope 6, two or more of the marks MK1 corresponding to the medical instruments 4 that are located outside the field of view of the endoscope 6 are displayed so as to correspond to the order of the arrangement positions of the arm 60a, the arm 60b, and the arm 60d. The order of the arrangement positions of the arm 60a, the arm 60b, and the arm 60d means the order of the positions of the arm 60a, the arm 60b, and the arm 60d in the state where the arm 60a, the arm 60b, and the arm 60d are attached to the arm base 50.

Further, as illustrated in FIG. 20, when all of the medical instruments 4 attached to the arm 60a, 60b, and 60d are located outside the field of view of the endoscope 6, the mark MK1 having the identification number "4" corresponding to the arm 60a, the mark MK1 having the identification number "3" corresponding to the arm 60b, and the mark MK1 having the identification number "1" corresponding to the arm 60d are displayed in that order so as to corresponding to the order of the arrangement positions of the arms 60a, 60b, and 60d. That is, the mark MK1 having the identification number "4", the mark MK1 having the identification number "3", and the mark MK1 having the identification number "1" are displayed in the arrangement order of the hand area G3a having identification number "4", the hand area G3b having identification number "3", and the hand area G3c having identification number "1".

Figure 23:
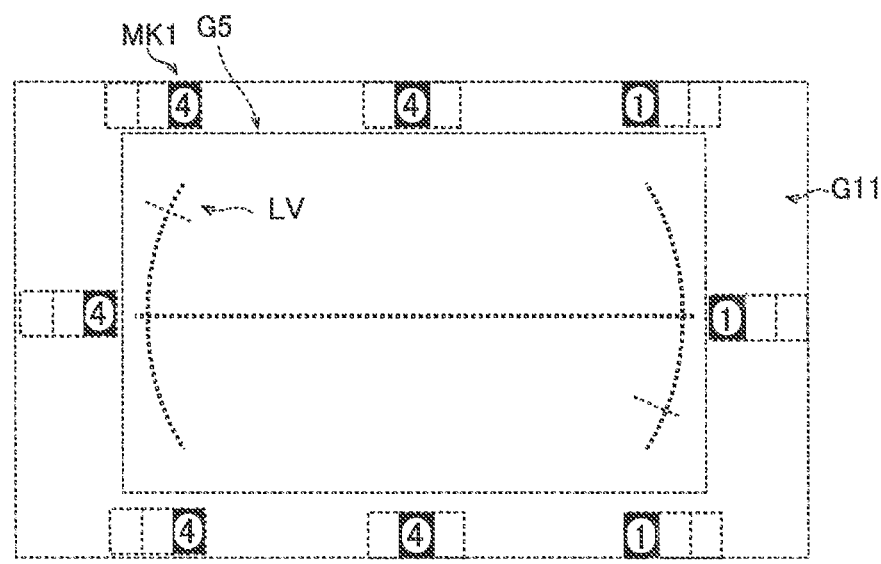
FIG. 23 is a diagram for explaining examples of marks displayed so as to be shifted toward the center according to a first embodiment.

Further, as illustrated in FIG. 23, when one or two of the medical instruments 4 attached to the arms 60a, 60b, and 60d are located outside the field of view of the endoscope 6, the mark(s) MK1 corresponding the one or two medical instruments 4 located outside the field of view of the endoscope 6 are displayed at the positions shifted toward the center of the screen gr of the monitor 24 than those in the state where all the marks MK1 are displayed. In other words, when only the medical instrument 4 attached to the arm 60a is located outside the field of view of the endoscope 6 and on the left side of the field of view of the endoscope 6, the mark MK1 having the identification number "4" of the medical instrument 4 attached to the arm 60a is displayed so as to be arranged closer to (shifted toward) the center of the screen gr than a position of the mark MK1 having identification number "4" displayed in the state where all the three marks MK1 having identification numbers "4", "3", and "1" are displayed (see FIG. 20).

Similarly, when only the medical instrument 4 attached to the arm 60a is located outside and on the lower side of the field of view of the endoscope 6, the mark MK1 having the identification number "4" corresponding to the medical instrument 4 attached to the arm 60a is displayed so as to be arranged closer to the center of the screen gr than a position of the mark MK1 having identification number "4" in the state where all the three marks MK1 having identification numbers "4", "3", and "1" are displayed (see FIG. 20). The same applies when only the medical instrument 4 attached to the arm 60a is located outside and on the upper side (diagonally upper left side, diagonally lower left side) of the field of view of the endoscope 6.

Similarly, when only the medical instrument 4 attached to the arm 60d is located outside and on the right side of the field of view of the endoscope 6, the mark MK1 having the identification number "1" corresponding to the medical instrument 4 attached to the arm 60d is displayed so as to be arranged closer to the center of the screen gr than a position of the mark MK1 having identification number "1" in the state where all the three marks MK1 having identification numbers "4", "3", and "1" are displayed (see FIG. 20). The same applies when only the medical instrument 4 attached to the arm 60d is located outside and on the right side (the diagonally upper right side, the diagonally lower right side) of the field of view of the endoscope 6.

(Display Method)

Figure 24:
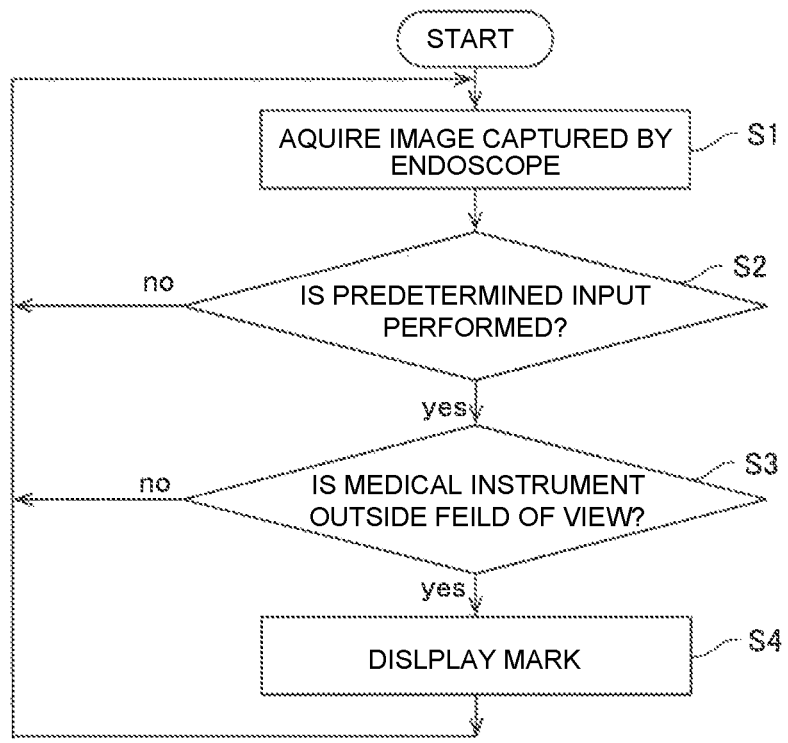
FIG. 24 is a flowchart for explaining a display method according to a first embodiment.

Next, with reference to FIG. 24, a method of displaying the graphical user interface G on the monitor 24 in the surgical operation system 100 is described. The graphic user interface G is generated by the image processing device 8b.

First, in step S1, the image processing device 8b acquires the endoscope image captured by the endoscope 6 configured to acquire the image of the surgical site.

Next, in step S2, the image processing device 8b determines whether or not the predetermined input through the camera pedal 22c or the enable switch 81 has been made. In the case of "Yes" in step S2, the process proceeds to step S3. In the case of "No" in step S2, the process returns to step S1.

Next, in step S3, the image processing device 8b determines whether at least one (any one) of the medical instruments 4 attached to the arms 60a, 60b, and 60d is located outside the field of view of the endoscope 6. In the case of "Yes" in step S3 (that is, in the case where the command that enables the movements of the endoscope 6 is received and at least one of the medical instruments 4 that are attached to the arm 60 is located outside the field of view of the endoscope 6), the process proceeds to step S4. In the case of "No" in step S4, the process returns to step S1.

Next, in step S4, the image processing device 8b displays, on the screen gr of the monitor 24, the graphical user interface G on the image captured by the endoscope 6 in the overlapped manner, such that the graphical user interface G displays the mark MK1 indicating the medical instrument 4 that is located outside the field of view of the endoscope 6 in the neighborhood area G11 of the level indication area G5 including the center CN1 of the monitor screen gr, wherein the neighborhood area G11, in which the mark MK1 is displayed, does not include the vicinity of the peripheral edge e of the monitor screen gr.

The operations of steps S1 to S4 described above are always performed during the operation of the surgical operation system 100.

Effects of First Embodiment

In a first embodiment, the following effects can be obtained.

In a first embodiment, as described above, the image processing device 8b is configured, in response to the predetermined input through the camera pedal 22c or the enable switch 81 when at least one of the medical instruments 4 is located outside the field of view of the endoscope, the mark MK1 indicating the medical instrument 4 that is located outside the field of view of the endoscope in the inner area of the graphical user interface G which does not include the vicinity of the peripheral edge of the display screen. Accordingly, the mark MK1 indicating the surgical instrument that is located outside the field of view of the endoscope is displayed at the position shifted to the center of the display screen from the vicinity of the peripheral edge of the display screen. As a result, the operator can easily visually recognize the mark MK1 indicating the medical instrument 4 that is located outside the field of view of the endoscope 6 without significantly moving the line of sight. Further, in response to the predetermined input through the camera pedal 22c or the enable switch 81, the mark MK1 indicating the medical instrument 4 that is located outside the field of view of the endoscope is displayed. Accordingly, when the predetermined input through the camera pedal 22c or the enable switch 81 is not performed, the mark MK1 is not displayed. As a result, it is possible to prevent displaying the mark MK1 at the position that is easy for the operator to see when the mark MK1 is unnecessary.

Further, in a first embodiment, as described above, the image processing device 8b is configured, in response to the predetermined input through the camera pedal 22c, which is different from the camera movement operation through the camera pedal 22c to move the endoscope 6, to display the mark MK1 on the graphical user interface G. Accordingly, the camera pedal 22c, which is to be used to move the endoscope 6, can be also used to display the mark MK1 corresponding to the medical instrument 4 that is located outside the field of view of the endoscope. As compared with the case of separately providing a dedicated input device to display the mark MK1, it is possible to suppress an increase in the number of parts and to simplify the configuration of the apparatus. Further, since the mark MK1 is displayed when the operation different from the camera movement operation is performed on the camera pedal 22c, it is possible to prevent the mark MK1 from being displayed when the camera movement operation is performed to move the endoscope 6. As a result, it is possible to prevent the mark MK1 from being unnecessarily displayed at the position that is easy for the operator to see, when moving the endoscope 6.

Further in a first embodiment, as described above, the image processing device 8b is configured, in response to the camera pedal 22c being operated twice in row within the predetermined time length as the predetermined input, which is the operation through the camera pedal 22c different from the camera movement operation input through the camera pedal 22c, to display the mark MK1 on the graphical user interface G. Therefore, by operating the camera pedal 22c twice in row within the predetermined time length, the marker MK1 corresponding to the medical instrument 4 that is located outside the field of view can be easily displayed.

Further in a first embodiment, as described above, the image processing device 8b displays the level indicator of the endoscope 6 in the level indicator display area G5 of the graphical user interface G while the camera movement operation is being performed on the camera pedal 22c. With this configuration, since the level indicator LV of the endoscope 6 is displayed when the endoscope 6 is moved, the operator can easily move the endoscope 6 while viewing the level indicator LV.

Further in a first embodiment, as described above, the image processing device 8b is configured to display the mark MK1 in a region, within the neighborhood area G11 of the level indication area G5, displaced from the level indication area G5 in a deviation direction in which the medical instrument 4 that is located outside the field of view of the endoscope is deviated from the field of view of the endoscope. With this configuration, the mark MK1 is arranged so as to correspond to the direction in which the medical instrument 4 outside the field of view is positioned with respect to the center CN2 of the level indication area G5. Accordingly, the operator can easily recognize which direction the medical instrument 4 outside the field of view of the endoscope 6 is displaced from the field of view of the endoscope 6 without significantly moving the line of sight.

Further in a first embodiment, as described above, the image processing device 8b is configured, in response to operating the enable switch 81 as the predetermined input, to display the mark MK1 on the graphical user interface G. Therefore, by operating the enable switch 81 provided to the manipulator, the mark MK1 corresponding to the medical instrument 4 that is located outside the field of view can be easily displayed.

Further in a first embodiment, the image processing device 8b is configured to display, on the display 8a, the graphical user interface G superimposed on the endoscope image captured by the endoscope 6. Thus, the indicator MK1 corresponding to the medical instrument 4 that is located outside the field of view can be displayed on the display 8a, which is to be viewed by the assistant who assists the operator in addition to the monitor 24, which is to be viewed by the operator. Accordingly, both the operator and the assistant can easily grasp the position of the medical instrument 4 that is located outside the field of view of the endoscope.

Further in a first embodiment, as described above, the image processing device 8b is configured to display the mark MK1 on the graphical user interface G only when the predetermined input through the camera pedal 22c or the enable switch 81 is made. As a result, it is possible to reliably prevent the mark MK1 from being unintentionally displayed, when it is unnecessary.

In a first embodiment, as described above, the mark MK1 includes the number that identifies the arm 60 that supports the medical instrument 4 that is located outside the field of view of the endoscope 6. With this configuration, the operator O can easily recognize which one or more of the medical instruments 4 is located outside the field of view of the endoscope 6.

Further in a first embodiment, as described above, the image processing device 8b is configured to display, the mark MK1 in the neighborhood area G11 that is provided outside and in the vicinity of the peripheral edge (the outer edge) of the level indication area G5 of the graphical user interface G. Further, the level indication area G5 has the rectangular shape including the upper side G5a, the left side G5b, the right side G5c, and the lower side G5d, such that the upper side G5a of the level indication area G5 is provided between the position upper from the center of the screen by the length of one tenth of the vertical length of the screen and the position lower from the upper end of the screen by the length of one tenth of the vertical length of the screen, the left side G5b of the level indication area G5 is provided between the position left from the center of the screen by the length of one tenth of the horizontal length of the screen and the position right from the left end of the screen by the length of one tenth of the horizontal length of the screen, the right side G5c of the level indication area G5 is provided between the position right from the center of the screen by the length of one tenth of the horizontal length of the screen and the position left from the right end of the screen by the length of one tenth of the horizontal length of the screen, and the lower side G5d of the level indication area G5 is provided between the position lower from the center of the screen by the length of one tenth of the vertical length of the screen and the position upper from the lower end of the screen by the length of one tenth of the vertical length of the screen. Accordingly, the mark MK1 displayed in the neighborhood area G11 in the vicinity of the peripheral edge of the level indication area G5 is located closer to the center of the screen gr from the edge portion e of the screen gr. Therefore, unlike the case where the mark MK1 is arranged at the edge portion e of the screen gr, the visibility of the mark MK1 can be improved.

Second Embodiment

Figure 26:
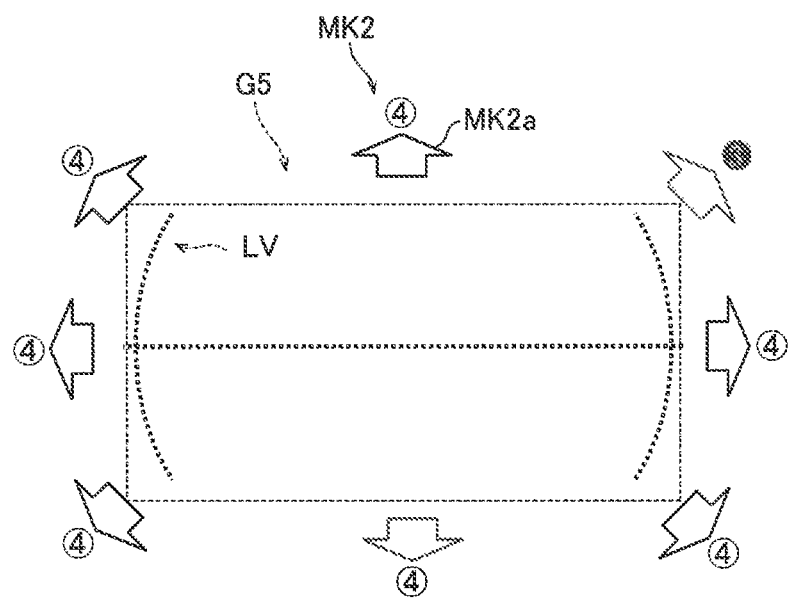
FIG. 26 is a diagram for explaining examples of marks according to a second embodiment.
Figure 27:
FIG. 27 is a diagram for explaining an example of a mark according to a second embodiment.

With reference to FIGS. 25 to 27, a configuration of a surgical operation system 200 according to a second embodiment is described.

In a second embodiment, as illustrated in FIGS. 25 and 26, the mark MK2 includes an arrow MK2a that indicates a direction in which the medical instrument 4 that is located outside the field of view of the endoscope 6 is deviated from the field of view of the endoscope 6. Specifically, the identification number (for example, "4") of the medical instrument 4 that is located outside the field of view of the endoscope 6 is displayed at a position in the vicinity of the arrow MK2a and on the outer side of the arrow MK2a. Note that the identification number may be displayed in the mark MK2, like a mark MK3 such as being illustrated in FIG. 27. The inside of the arrow MK2a is displayed as transparent or translucent so that the image captured by the endoscope can be seen through the arrow. When the medical instrument 4 is an operation target, the identification number in the mark MK2 corresponding to the target medical instrument 4 (the target arm 60) is displayed in black color in a white circle (see the number "4" in FIG. 26). When the medical instrument 4 is not an operation target, the identification number in the mark MK2 corresponding to the non-target medical instrument 4 (the non-target arm 60) is displayed in gray color in a black circle (see the identification number "3" in FIG. 26). The arrow MK2a is displayed in a plane.

Effects of Second Embodiment

In a second embodiment, the following effects can be obtained.

In a second embodiment, as described above, the mark MK2 includes the arrow MK2a that indicates the direction in which the medical instrument 4 that is located outside the field of view of the endoscope 6 is deviated from the field of view of the endoscope 6. With this configuration, the operator O can intuitively recognize the direction in which the medical instrument 4 that is located outside the field of view of the endoscope 6 is displaced from the field of view of the endoscope 6.

(Modifications)

Note that one or more embodiments disclosed herein should be considered as exemplary in all respects and do not limit the invention. The scope of the invention is indicated by claims, not by explanation of one or more embodiments described above, and includes equivalents to the claims and all alterations (modification) within the same.

For example, in first and second embodiments described above, the case has been described in which the image processing device 8b acquires the image from the endoscope 6 and generates the graphical user interface G. However, the invention is not limited thereto. For example, in a modification, the control unit 31 of the medical manipulator 1, a control unit (not illustrated) of the remote control apparatus 2, or the like may generate the graphical user interface G. Further, in a modification, an image processing device that acquires the image from the endoscope 6 to perform image processing and an image processing device that generates a graphical user interface G to be superimposed on the image acquired from the endoscope 6 may be separately provided.

Further, in first and second embodiments described above, the case has been described in which the image processing device 8b determines whether or not an input is made through the camera pedal 22c or the enable switch 81. However, the invention is not limited thereto. For example, the control unit 31 may determine whether or not the predetermined input has been made through the camera pedal 22c or the enable switch 81.

Further, in first and second embodiments described above, the case has been described in which the image processing device 8b determines whether at least one (any one) of the medical instruments 4 attached to the arms 60a, 60b, and 60d is located outside the field of view of the endoscope 6. However, the invention is not limited thereto. For example, the control unit 31 may determine whether or not any one of the medical instruments is located outside the field of view of the endoscope, and transmit the determination result to the image processing device 8b.

Further in first and second embodiments described above, the case has been described in which the mark MK1 is displayed in one of the regions G12 (G12a, G12b, G12c, G12d, G12e, G12f, G12g, or G12h) that corresponds to the direction in which the medical instrument 4 is deviated from the field of view of the endoscope 6. However, the invention is not limited thereto. However, the invention is not limited thereto. For example, the mark MK2 may be displayed at a fixed position in the neighborhood area G11 of the level indication area G5.

In first and second embodiments described above, the case has been described in which the neighborhood area G11 is divided into the eight regions G12 by the radial lines radially extending from the center CN2 of the level indication area G5, so as to display the mark MK1 in one of the divided regions G12. However, the invention is not limited thereto. For example, the number of the divided regions G12 may be a number other than eight.

Further, in first and second embodiments described above, the case has been described in which the mark MK1 is displayed on the graphical user interface G in response to the predetermined input in which the camera pedal 22c is operated twice in row within the predetermined length of time. However, the invention is not limited thereto. For example, the mark MK1 may be displayed on the graphical user interface G in response to a predetermined input in which the camera pedal 22c is operated three times in row within a predetermined length of time.

Also, in first and second embodiments described above, the case has been described in which the enable switch 81, the joystick 82, and the switch portion 83 are provided to each of the plurality of arms 60. However, the invention is not limited thereto. For example, at least one of the plurality of arms may be provided with the enable switch 81, the joystick 82, and the switch portion 83.

Further, in first and second embodiments described above, the case has been described in which the mark MK1 is displayed on the graphical user interface G in response to operating the enable switch 81 of the arm 60. However, the invention is not limited thereto. For example, the mark MK1 may be displayed on the graphical user interface G in response to operating another switch provided to the arm 60 (such as the joystick 82, the switch portion 83, or the like).

Further in first and second embodiments described above, the case has been described in which the image processing device 8b displays the mark MK1 on the graphical user interface G only when the predetermined input is made through the camera pedal 22c or the enable switch 81. However, the invention is not limited thereto. For example, the mark MK1 may also be displayed on the graphical user interface G when a predetermined input is made through another input device.

Further in first and second embodiments described above, the mark MK1 is displayed outside the level indication area G5. However, the invention is not limited thereto. For example, the mark MK1 may be displayed in the level indication area G5.

Further in first and second embodiments described above, the case has been described in which the level indication area G5 has the rectangular shape. However, the disclosure is not limited thereto. For example, in a modification, the level indication area G5 may have a shape other than the rectangular shape (e.g., an oval shape or the like).

Further in first and second embodiments described above, the case has been described in which the camera area G2 and the hand areas G3 (the hand area G3a, the hand area G3b, and the hand area G3c) are displayed in the area in the vicinity of the lower end ed of the screen gr of the monitor 24. However, the invention is not limited thereto. However, the invention is not limited thereto. For example, the camera area G2 and the hand areas G3 (the hand area G3a, the hand area G3b, and the hand area G3c) may be displayed in an area in the vicinity of the upper end eu of the screen gr of the monitor 24. Specifically, the camera area G2 and the hand areas G3 may be displayed between the upper end eu of the screen gr and a position blow the upper end eu of the screen gr by the length (L11) of one tenth of the vertical length of the screen gr.

Further, in first and second embodiments described above, the case has been described in which, when two or more of the medical instruments 4 are located outside the field of view of the endoscope 6, two or more marks MK1 corresponding to the two or more of the medical instruments 4 are displayed in the arrangement order of the arms 60 that supports the two or more of the medical instruments 4. However, the invention is not limited thereto. For example, the order of the positions of the marks MK1 displayed may be different from the order of the physical positions of the arms 60 that support the medical instruments 4.

Further, in first and second embodiments described above, the case has been described in which, when one or two of the medical instruments 4 are located outside the field of view of the endoscope 6, the one or two marks MK1 corresponding to the one or two of the medical instruments 4 are displayed at the positions shifted toward the center of the screen g than those when all the marks MK1 are displayed in one region G12. However, the invention is not limited thereto. For example, in each region G12, a position of each of the marks MK1 corresponding to the medical instruments 4 may be fixed.

Further, in first and second embodiments described above, the case has been described in which the mark MK1 is displayed in different manners depending on whether the medical instrument 4 located outside the field of view is an operation target or not. However, the invention is not limited thereto. For example, the mark MK1 may be displayed in the same manner regardless of whether the medical instrument 4 located outside the field of view is an operation target or not.

Further, in first and second embodiments described above, the case has been described in which the number of the arms 60 provided is four. However, the invention is not limited thereto. In a modification, the number of the arms 60 may be any number as long as at least one is provided.

Further, in first and second embodiments described above, the case has been described in which each of the arm portion 61 and the positioner 40 are configured as the 7-axis articulated robot. However, the invention is not limited thereto. For example, each of the arm portion 61 and the positioner 40 may be configured as an articulated robot other than the 7-axis articulated robot (for example, a 6-axis articulated robot, an 8-axis articulated robot, or the like).

Further, in first and second embodiments described above, the case has been described in which the medical manipulator 1 includes the medical trolley 3, the positioner 40, and the arm base 50. However, the invention is not limited thereto. For example, the medical manipulator 1 may include only the arms 60 and not include the medical trolley 3, the positioner 40, or the arm base 50.

Further, in a first embodiment described above, the case has been described in which each of the identification numbers (1 to 4) of the arms 60) is displayed in the black squire. However, the disclosure is not limited thereto. For example, in a modification, a mark MK4 such as being illustrated in FIG. 28 may include the outer edge el of the black squire surrounded by another color (such as, red, or the like). Furthermore, in a modification, a mark MK5 such as being illustrated in FIG. 29A may be displayed having the identification number of the arm 60 in the white oval without the black square (e.g., when the medical instrument 4 is an operation target), or a mark MK5 such as being illustrated in FIG. 29B may be displayed having the gray-colored identification number of the arm 60 without the black squire and the white oval (e.g., when the medical instrument is a non-operation target).

Further, in a second embodiment described above, the case has been described in which the arrow MK2a is two-dimensionally displayed. However, the disclosure is not limited thereto. For example, the arrow MK2a may be three-dimensionally displayed. With this configuration, it is possible for the operator to distinguish between (recognize) a state where the medical instrument 4 that is located outside the field of view of the endoscope 6 is located close to the operator and a state where the medical instrument 4 that is located outside the field of view of the endoscope 6 is located far from the operator.

Further, in first and second embodiments described above, the case has been described in which the level indication area G5 in which the level indicator LV is displayed serves as a center area according to the invention. However, the invention is not limited thereto. In a modification, an area other than the level indication area G5 may serve as the center area.

The functions of each of the elements disclosed herein may be carried out by a circuitry or a processing circuitry including a general purpose processor, a dedicated processor, an integrated circuit, an ASIC (Application Special Integrated Circuit), a conventional circuit, or a combination of two or more of them, that is configured or programmed to perform the functions. A processor is considered a processing circuitry or a circuitry because it contains transistors and other circuit elements. In the disclosure, a circuit, a unit, or a means may be either a hardware that is configured to perform the recited function(s) or a hardware that is programmed to perform the recited function(s). The hardware may be the hardware disclosed herein, or may be other known hardware that is programmed or configured to perform the function(s) described. If the hardware is a processor which is considered as a type of a circuit, a circuit, a means, or a unit is a combination of hardware and software, and the software is used to configure the hardware and/or the processor.

The invention includes other embodiments or modifications in addition to one or more embodiments and modifications described above without departing from the spirit of the invention. The one or more embodiments and modifications described herein are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A surgical system comprising:
manipulators that support an endoscope and surgical instruments, respectively;
a remote control apparatus that includes: a first display device including a first display configured to display an endoscope image captured by the endoscope; and two operation handles configured to operate two of the surgical instruments;
a controller configured to display, on the first display, a graphical user interface superimposed on the endoscope image captured by the endoscope; and
an input device provided to the manipulator that supports the endoscope and configured to receive a predetermined user input, wherein
the controller is configured to switch between a first mode and a second mode,
the controller is configured, in the first mode, to display, in response to receiving the predetermined user input through the input device when a distal end of at least one of the surgical instruments is located outside a field of view of the endoscope, a mark that indicates the surgical instrument that is located outside the field of view of the endoscope in a mark display area of the graphical user interface, and to not display the mark in response to not receiving the predetermined user input through the input device, and the controller is configured, in the second mode, to not display the mark regardless of whether the predetermined user input is received through the input device.

2. The surgical system according to claim 1, wherein the input device includes a switch, and
the controller is configured, in response to the switch being operated as the predetermined user input, to display the mark in the mark display area.

3. The surgical system according to claim 1, wherein the manipulator that supports the endoscope includes an operation member configured to operate the manipulator that supports the endoscope and an enable switch configured to enable the operation member to operate the manipulator that supports the endoscope,
the input device comprises the enable switch, and
the controller is configured, in response to the enable switch being operated as the predetermined user input, to display the mark in the mark display area.

4. The surgical system according to claim 1, further comprising:
a second display device including a second display provided separately from the first display device, wherein
the controller is configured to further display, on the second display, the graphical user interface superimposed on the endoscope image captured by the endoscope.

5. The surgical system according to claim 1, wherein the controller is configured, while the predetermined user input is received through the input device, to display the mark in the mark display area.

6. The surgical system according to claim 5, wherein the controller is configured, in response to receiving the predetermined user input through the input device, to display a level indicator of the endoscope in a center area of the graphical user interface.

7. The surgical system according to claim 6, wherein the mark display area is a neighborhood area in a vicinity of a peripheral edge of the center area of the graphical user interface, and
the controller is configured to display the mark at a position, in the mark display area, that corresponds to a direction in which the surgical instrument that is located outside of the field of view of the endoscope is deviated from the field of view of the endoscope.

8. The surgical system according to claim 1, wherein the mark includes an identification number that identifies the manipulator that supports the surgical instrument that is located outside the field of view of the endoscope.

9. The surgical system according to claim 1, wherein the mark includes an arrow that indicates a direction in which the surgical instrument that is located outside the field of view of the endoscope is deviated from the field of view of the endoscope.

10. The surgical system according to claim 1, wherein the controller is configured to determine whether or not each of distal ends of the surgical instruments is positioned outside the field of view of the endoscope, based on imaging range information of the endoscope and position information of the distal ends of the surgical instruments supported by the manipulators.

11. The surgical system according to claim 1, wherein the mark display area is a neighborhood area in a vicinity of a peripheral edge of a center area of the graphical user interface,
the center area has a rectangular shape having an upper side, a left side, a right side, and lower side thereof,
the upper side of the center area is provided between a position upper from a center of the first display by a length of one tenth of a vertical length of the first display and a position lower from an upper end of the first display by the length of one tenth of the vertical length of the first display,
the left side of the center area is provided between a position left from the center of the first display by a length of one tenth of a horizontal length of the first display and a position right from a left end of the first display by the length of one tenth of the horizontal length of the first display,
the right side of the center area is provided between a position right from the center of the first display by the length of one tenth of the horizontal length of the first display and a position left from a right end of the first display by the length of one tenth of the horizontal length of the first display, and
the lower side of the center area is provided between a position lower from the center of the first display by the length of one tenth of the vertical length of the first display and a position upper from a lower end of the first display by the length of one tenth of the vertical length of the first display.

12. The surgical system according to claim 1, wherein the first display has a rectangular shape in which a vertical length thereof and a horizontal length thereof are not equal, and an aspect ratio of a peripheral edge of the mark display area is same as an aspect ratio of a peripheral edge of the first display.

13. The surgical system according to claim 12, wherein the controller is configured to display the mark in a region, among eight divided regions in which the mark display area is divided according to a shape of the first display, that corresponds to a direction in which the surgical instrument that is located outside the field of view of the endoscope is deviated from the field of view of the endoscope.

14. The surgical system according to claim 13, wherein the horizontal length of the first display is greater than the vertical length of the first display, and
the mark display area is divided according to the shape of the first display into the eight divided regions including an upper region, a lower region, a right region, a left region, an upper right region, an upper left region, a lower right region, and a lower left region, such that angles of the upper region and the lower region are greater than angles of the right region, the left region, the upper right region, the upper left region, the lower right region, and the lower left region.

15. The surgical system according to claim 1, wherein the remote control apparatus includes a camera pedal configured to enable the two operation handles to move the endoscope, and
the controller is configured, while the camera pedal is operated, to display a level indicator of the endoscope in a center area of the graphical user interface.

16. The surgical system according to claim 1, wherein the controller is configured to set the first mode if the distal end of at least one of the surgical instruments is located outside the field of view of the endoscope, and to set the second mode if the distal ends of all of the surgical instruments are located inside the field of view of the endoscope.

17. A surgical system comprising:
a first manipulator that supports a first surgical instrument;
a second manipulator that supports a second surgical instrument;
a third manipulator that supports a third surgical instrument;
a fourth manipulator that supports an endoscope;
a remote control apparatus that includes: a display device including a display configured to display an endoscope image captured by the endoscope; and two operation handles configured to operate two of the first to fourth surgical instruments except for the endoscope; and
a controller configured to display, on the display, a graphical user interface superimposed on the endoscope image captured by the endoscope; and
first to fourth input devices respectively provided to the first to fourth manipulators and respectively configured to receive a first to a fourth predetermined user input, wherein
the controller is configured to switch between a first mode and a second mode,
the controller is configured, in the first mode, to display, in response to receiving the fourth predetermined user input through the fourth input device when a distal end of at least one of the first to third surgical instruments is located outside a field of view of the endoscope, a mark that corresponds to the surgical instrument that is located outside the field of view of the endoscope in a mark display area of the graphical user interface, and to not display the mark in response to not receiving the fourth predetermined user input through the fourth input device, and
the controller is configured, in the second mode, to not display the mark regardless of whether the fourth predetermined user input is received through the fourth input device.

18. A surgical system comprising:
manipulators that support an endoscope and surgical instruments, respectively;
a remote control apparatus that includes: a display device including a display configured to display an endoscope image captured by the endoscope; and two operation handles configured to operate two of the surgical instruments;
an input device provided to the manipulator that supports the endoscope and configured to receive a predetermined user input; and
a controller configured to display, on the display, a graphical user interface superimposed on the endoscope image captured by the endoscope, wherein
the controller is configured to switch between a first mode and a second mode,
the controller is configured, in the first mode, to display, in response to receiving the predetermined user input through the input device when a distal end of at least one of the surgical instruments is located outside a field of view of the endoscope, a mark that indicates the surgical instrument that is located outside the field of view of the endoscope in a mark display area of the graphical user interface, and to not display the mark in response to not receiving the predetermined user input through the input device,
the controller is configured, in the second mode, to not display the mark regardless of whether the predetermined user input is received through the input device,
a horizontal length of the display is greater than a vertical length of the display, and
the controller is configured to display the mark in a region, among eight divided regions into which the mark display area is divided according to a shape of the display, that corresponds to a direction in which the surgical instrument that is located outside the field of view of the endoscope is deviated from the field of view of the endoscope.

19. The surgical system according to claim 18, wherein the mark display area is divided into the eight divided regions including an upper region, a lower region, a right region, a left region, an upper right region, an upper left region, a lower right region, and a lower left region, such that angles of the upper region and the lower region are greater than angles of the right region, the left region, the upper right region, the upper left region, the lower right region, and the lower left region.

20. The surgical system according to claim 19, wherein a peripheral edge of the display including upper, lower, right, and left sides of the display is divided into eight line segments by radial lines that divides the mark display area into the eight divided regions, wherein lengths of the line segments corresponding to the upper region and the lower region are greater than lengths of the line segments corresponding to the right region, the left region, the upper right region, the upper left region, the lower right region, and the lower left region.

* * * * *